US009237555B2

(12) United States Patent
Kim et al.

(10) Patent No.: US 9,237,555 B2
(45) Date of Patent: Jan. 12, 2016

(54) METHOD AND DEVICE FOR CONFIGURING A CARRIER INDICATION FIELD FOR A MULTI-CARRIER

(75) Inventors: Soyeon Kim, Gyeonggi-do (KR); Jaehoon Chung, Gyeonggi-do (KR); Seunghee Han, Gyeonggi-do (KR); Minseok Noh, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 211 days.

(21) Appl. No.: 13/698,942

(22) PCT Filed: May 6, 2011

(86) PCT No.: PCT/KR2011/003406
§ 371 (c)(1),
(2), (4) Date: Feb. 4, 2013

(87) PCT Pub. No.: WO2011/145823
PCT Pub. Date: Nov. 24, 2011

(65) Prior Publication Data
US 2013/0136006 A1  May 30, 2013

Related U.S. Application Data

(60) Provisional application No. 61/345,586, filed on May 17, 2010, provisional application No. 61/380,718, filed on Sep. 8, 2010, provisional application No. 61/383,313, filed on Sep. 15, 2010.

(51) Int. Cl.
*H04W 4/00* (2009.01)
*H04W 72/04* (2009.01)
*H04L 5/00* (2006.01)

(52) U.S. Cl.
CPC .............. *H04W 72/04* (2013.01); *H04L 5/001* (2013.01); *H04L 5/0053* (2013.01); *H04L 5/0091* (2013.01); *H04L 5/0098* (2013.01)

(58) Field of Classification Search
CPC ...... H04L 5/001; H04L 5/0098; H04W 72/04
See application file for complete search history.

(56) References Cited

U.S. PATENT DOCUMENTS

2010/0271970 A1* 10/2010 Pan et al. ............... 370/252
2010/0296467 A1* 11/2010 Pelletier et al. ......... 370/329
2010/0322158 A1* 12/2010 Lee et al. ............... 370/329
2011/0141985 A1*  6/2011 Larsson et al. .......... 370/329

OTHER PUBLICATIONS

Panasonic, "Component Carrier Indication Scheme for Carrier Aggregation," 3GPP TSG-RAN WG 1 Meeting #58, R1-093465, Agenda Item 15.4, Shenzhen, China, Aug. 24-28, 2009, 3 pages.

(Continued)

*Primary Examiner* — David Oveissi
(74) *Attorney, Agent, or Firm* — Birch, Stewart, Kolasch & Birch, LLP

(57) ABSTRACT

Provided are a method and device for configuring a carrier indication field (CIF) for a multi-carrier. A method for allocating a CIF in a carrier aggregation system includes: transmitting carrier aggregation configuration information having at least one secondary component carrier to a terminal through a primary component carrier; allocating a CIF value to the primary component carrier and to the at least one secondary component carrier; and maintaining or removing a CIF value allocated to a deactivated secondary component carrier when the secondary component carrier having the allocated CIF value is deactivated.

10 Claims, 18 Drawing Sheets

(56) References Cited

OTHER PUBLICATIONS

Samsung, "CIF Configuration," 3GPP TSG RAN WG1 #61, R1-102998, Agenda Item 6.2.3.1, Montreal, Canada, May 10-14, 2010, 3 pages.

Samsung, "On CIF Reconfiguration," 3GPP TSG-RAN2#69bis Meeting, Tdoc R2-102449, Agenda Item 7.1.1.2, Beijing, China, Apr. 12-16, 2010, 2 pages.

ZTE, "On LS for the CIF Application Cases in SPS Scheduling," 3GPP TSG-RAN WG1 #61, R1-102893, Agenda Item 4, Montreal, Canada, May 10-14, 2010, 2 pages.

\* cited by examiner (a)

(b)

METHOD AND DEVICE FOR CONFIGURING A CARRIER INDICATION FIELD FOR A MULTI-CARRIER

This application is the National Phase of PCT/KR2011/003406 filed on May 6, 2011, which claims priority under 35 U.S.C. 119(e) to US Provisional Application Nos. 61/345,586 filed on May 17, 2010, 61/380,718 filed on Sep. 8, 2010 and 61/383,313 filed on Sep. 15, 2010, all of which are hereby expressly incorporated by reference into the present application.

TECHNICAL FIELD

This disclosure relates to wireless communication, and more particularly, to a method for configuring a carrier indicator field for multiple carriers and an apparatus using the same.

BACKGROUND ART

As an example of a mobile communication system to which the present invention is applicable, 3rd Generation Partnership Project (3GPP) Long Term Evolution (hereinafter, referred to as 'LTE') and LTE-Advanced (hereinafter, referred to as 'LTE-A') communication systems are briefly described.

One or more cells are present in one Base Station (BS). A cell is set to use one of bandwidths of 1.25 MHz, 2.5 MHz, 5 MHz, 10 MHz, and 20 MHz to provide a downlink (DL) or uplink (UL) transport service to several UEs. Different cells may be set to provide different bandwidths. The BS controls data transmission/reception for a plurality of UEs. The BS transmits DL scheduling information with respect to DL data to inform a corresponding UE of a data transmission time/frequency domain, coding, data size, and Hybrid Automatic Repeat and reQuest (HARQ)-related information. In addition, the BS transmits UL scheduling information with respect to UL data to a corresponding UE to inform the UE of an available time/frequency domain, coding, data size, and HARQ-related information. An interface for transmitting user traffic or control traffic may be used between BSs.

Although radio communication technology has been developed up to LTE based on Wideband Code Division Multiple Access (WCDMA), demands and expectations of users and service providers are continuing to increase. In addition, since other radio access techniques continue to be developed, new technical evolution is required to secure future competitiveness. Decrease of cost per bit, increase of service availability, flexible use of a frequency band, simple structure, open interface, and suitable power consumption by a UE are required.

Recently, 3GPP has been establishing a standard task for a subsequent technique of LTE. In this disclosure, such a technique is referred to as 'LTE-A'. One of the main differences between an LTE system and an LTE-A system is system bandwidth and the introduction of a relay node.

The LTE-A system is aimed at supporting a broadband of a maximum of 100 MHz and, to this end, the LTE-A system is designed to use a carrier aggregation or bandwidth aggregation technique using a plurality of frequency blocks. Carrier aggregation employs a plurality of frequency blocks as one large logical frequency band in order to use a wider frequency band. A bandwidth of each frequency block may be defined based on a bandwidth of a system block used in the LTE system. Each frequency block is transmitted using a Component Carrier (CC).

DETAILED DESCRIPTION OF THE INVENTION

Technical Problems

This disclosure is to solve the above problems, and therefore this disclosure is directed to providing a method and apparatus for configuring a Carrier Indicator Field (CIF) for multiple carriers. Especially, this disclosure is directed to providing a method and apparatus for indicating a CC in carrier aggregation using a CIF of a fixed length.

In addition, this disclosure is directed to providing a method and apparatus for configuring a CIF according to deactivation of a CC or a secondary cell. Especially, this disclosure is directed to providing a method and apparatus for processing a CIF value allocated to a CC or a secondary cell upon deactivation of the CC and the secondary cell while cross-carrier scheduling is used. Further, this disclosure is directed to providing a method and apparatus for processing a CIF to monitor a PDCCH according to deactivation of a CC or secondary cell.

It will be appreciated by persons skilled in the art that that the technical objects that can be achieved through this disclosure are not limited to what has been particularly described hereinabove and other technical objects of the present invention will be more clearly understood from the following detailed description.

Technical Solutions

As an aspect, a method for allocating a Carrier Indication Field (CIF) in a carrier aggregation system is disclosed. The method includes transmitting carrier aggregation configuration information including at least one secondary component carrier to a User Equipment (UE) through a primary component carrier; allocating CIF values to the primary component carrier and the at least one secondary component carrier; and if the secondary component carrier to which the CIF value is allocated is deactivated, maintaining or releasing the CIF value allocated to the deactivated secondary component carrier.

The above one aspect and other aspects may include one of the following features.

If the CIF value is released, the method may further include reallocating CIF values to secondary component carriers except for the deactivated secondary component carrier and to the primary component carrier.

The method may further include allocating a new secondary component carrier to the UE. If the CIF value is released, the released CIF value may be allocated to the new secondary component carriers.

The primary component carrier may be a Physical Downlink Control Channel (PDCCH) monitoring component carrier.

The CIF values may be expressed as indexes of component carriers or component carrier groups. The indexes may be configured according to the number of component carriers or component carrier groups supported by a Base Station (BS) or according to the number of component carriers or component carrier groups allocated to the UE. The indexes may be configured based on the size of the CIF values, designated first to component carrier groups allocated to the UE, and then designated to component carriers. The indexes may be used for cross-carrier scheduling.

Meanwhile, as another aspect, a method for monitoring a control channel in a carrier aggregation system is disclosed. The method includes monitoring a plurality of PDCCHs through a PDCCH monitoring component carrier; and receiving Downlink Control Information (DCI) through a PDCCH which has succeeded in blind decoding among the plurality of PDCCHs.

The above another aspect and other aspects may include one of the following features.

The DCI may include a Carrier Indicator Field (CIF) expressed as indexes of Component Carriers (CCs) or CC groups and the indexes of the CCs may be UE-specifically configured.

The indexes may be designated to the CC groups based on the size of the CIF and the remaining CIF state values may be designated to the CCs.

The CC group may include one or more CCs.

The indexes are used for cross-carrier scheduling.

Advantageous Effects

According to embodiments of this disclosure, the following effects can be obtained.

A wireless communication system according to the embodiments of this disclosure can indicate a CC for cross-carrier scheduling even through a CIF of a fixed length.

Especially, the wireless communication system according to the embodiments of this disclosure can perform scheduling by allocating 8 or more CCs to a UE even when the size of a CIF is 3 bits.

The wireless communication system according to the embodiments of this disclosure can configure a CIF for cross-carrier scheduling in consideration of a fixed length of the CIF and the number of CCs.

Meanwhile, the wireless communication system according to the embodiments of this disclosure can be configured to maintain a CIF of a deactivated CC or SCell even when the CC or SCell is deactivated so that the maintained CIF can be reassigned when the deactivated CC or SCell is activated.

The wireless communication system according to the embodiments of this disclosure can increase a use degree of a CIF when a CC or an SCell is deactivated by releasing the CIF of the deactivated CC or SCell.

It will be appreciated by persons skilled in the art that that the effects that can be achieved through the present invention are not limited to what has been particularly described hereinabove and other advantages of the present invention will be more clearly understood from the following detailed description. Namely, effects which are not intended in carrying out the present invention can be derived from the embodiments of the present invention by those with ordinary skill in the art.

BEST MODE FOR CARRYING OUT THE INVENTION

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details. For example, although the following detailed description is given under the assumption that mobile communication systems are 3GPP LTE and LTE-A systems, aspects of the present invention that are not specific to the 3GPP LTE and LTE-A systems are applicable to other mobile communication systems.

In some instances, known structures and/or devices are omitted or are shown in block diagram form focusing on important features of the structures and/or devices, so as not to obscure the concept of the present invention. The same reference numbers will be used throughout this disclosure to refer to the same or like parts.

In the following description, User Equipment (UE) is assumed to refer to a mobile or fixed user end device such as a Mobile Station (MS), an Advanced Mobile Station (AMS), etc. and Base Station (BS) is assumed to refer to any node of a network end, such as a Node B, an eNode B, an Access Point (AP), etc., communicating with the UE. A relay may be referred to as a Relay Node (RN), a Relay Station (RS), etc.

In a mobile communication system, a UE and an RN may receive information from a BS on a DL and transmit information to the BS on a UL. The information transmitted or received by the UE and RN includes data and various control information and a variety of physical channels are defined according to the types and usages of the information transmitted or received by the UE and RN.

Physical Channels and Signal Transmission Method

Figure 1:
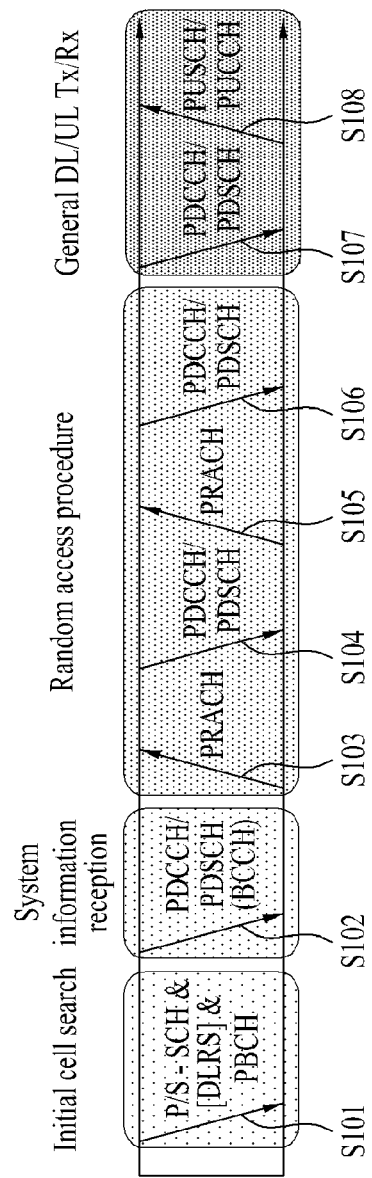
FIG. 1 is a diagram showing physical channels used in a 3GPP system and a general signal transmission method using the same.

FIG. 1 is a diagram showing physical channels used in a 3GPP system and a general signal transmission method using the same.

A UE performs an initial cell search procedure such as establishment of synchronization with a BS when power is turned on or the UE enters a new cell (step S101). The UE may receive a Primary Synchronization Channel (P-SCH) and a Secondary Synchronization Channel (S-SCH) from the BS to establish synchronization with the BS and acquire information such as a cell identity (ID). Thereafter, the UE may receive a physical broadcast channel from the BS to acquire broadcast information within the cell. Meanwhile, the UE may receive a Downlink Reference Signal (DL RS) in the initial cell search step to confirm a DL channel state.

Upon completion of the initial cell search procedure, the UE may receive a Physical Downlink Control Channel (PDCCH) and a Physical Downlink Shared Channel (PDSCH) according to information included in the PDCCH to acquire more detailed system information (step S102).

Meanwhile, if the UE initially accesses the BS or if radio resources for signal transmission are not present, the UE may perform a random access procedure (steps S103 to S106) with respect to the BS. To this end, the UE may transmit a specific sequence through a Physical Random Access Channel (PRACH) as a preamble (steps S103 and S105), and receive a response message to the preamble through the PDCCH and the PDSCH corresponding thereto (steps S104 and S106). In the case of a contention-based RACH, a contention resolution procedure may be additionally performed.

The UE which performs the above procedures may receive a PDCCH/PDSCH (step S107) and transmit a Physical Uplink Shared Channel (PUSCH)/Physical Uplink Control Channel (PUCCH) (step S108) as a general UL/DL signal transmission procedure. Information transmitted by the UE to the BS on UL or received by the UE from the BS on DL includes a DL/UL Acknowledgement/Negative Acknowledgement (ACK/NACK) signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Structure of Radio Frame of 3GPP LTE System

Figure 2:
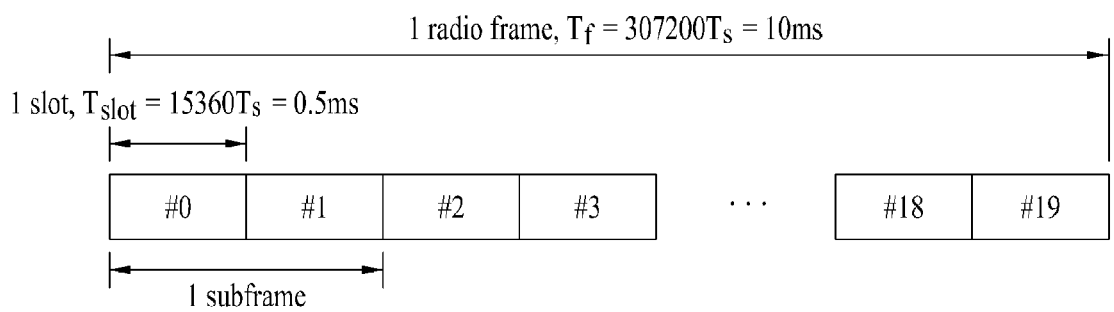
FIG. 2 is a diagram showing the structure of a radio frame used in a 3GPP LTE system which is an exemplary mobile communication system.

FIG. 2 is a diagram showing the structure of a radio frame used in a 3GPP LTE system which is an exemplary mobile communication system.

Referring to FIG. 2, one radio frame has a length of 10 ms (307200 $T_s$) and includes 10 equally-sized subframes. Each of the subframes has a length of 1 ms and includes two slots. Each of the slots has a length of 0.5 ms (15360 $T_s$). In this case, $T_s$ denotes a sampling time and is represented by $T_s=1/(15\ \text{kHz}\times2048)=3.1552\times10^{-8}$ (about 33 ns). Each slot includes a plurality of Orthogonal Frequency Division Multiplexing (OFDM) symbols or Single Carrier-Frequency Division Multiple Access (SC-FDMA) symbols in a time domain and includes a plurality of Resource Blocks (RBs) in a frequency domain.

In the LTE system, one RB includes 12 subcarriers×7 (or 6) OFDM symbols or SC-FDMA symbols. A Transmission Time Interval (TTI) which is a unit time for data transmission may be determined in units of one or more subframes. The above-described structure of the radio frame is purely exemplary and various modifications may be made in the number of subframes included in the radio frame, the number of slots included in a subframe, and the number of OFDM or SC-FDMA symbols included in a slot.

Structure of DL and UL Subframes of 3GPP LTE System

Figure 3:
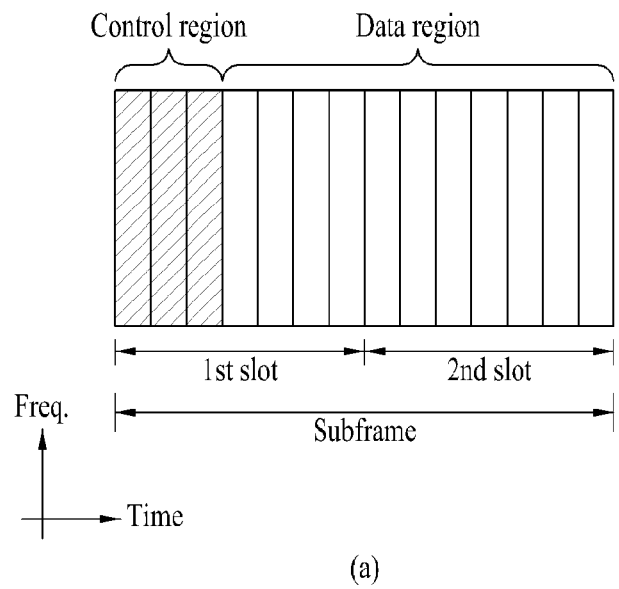
FIG. 3 is a diagram showing the structure of DL and UL subframes of a 3GPP LTE system which is an exemplary mobile communication system.
Figure 3:
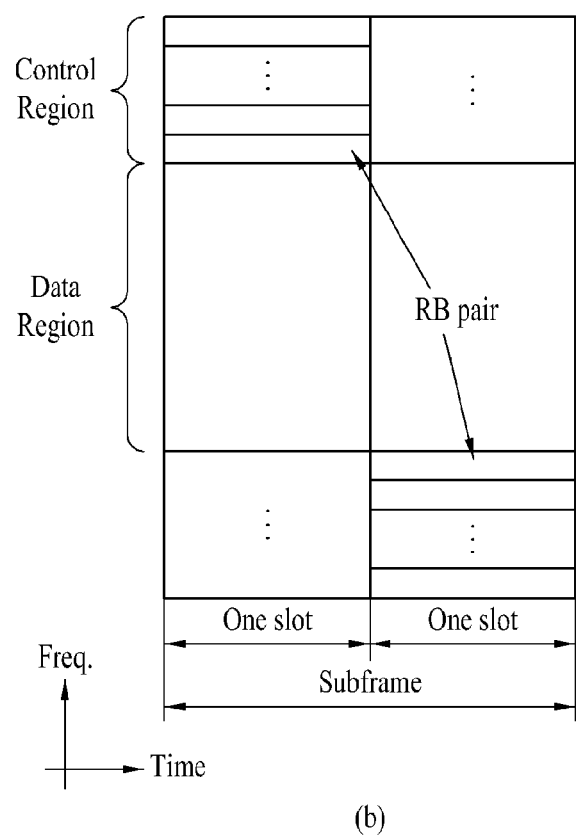

FIG. 3 is a diagram showing the structure of DL and UL subframes of a 3GPP LTE system which is an exemplary mobile communication system.

Referring to FIG. 3(a), one DL subframe includes two slots in a time domain. A maximum of 3 front OFDM symbols of the first slot within the DL subframe is a control region in which control channels are allocated, and the other OFDM symbols are a data region in which a Physical Downlink Shared Channel (PDSCH) is allocated.

DL control channels used in the 3GPP LTE system include a Physical Control Format Indicator Channel (PCFICH), a Physical Downlink Control Channel (PDCCH), a Physical Hybrid-ARQ Indicator Channel (PHICH), etc. The PCFICH, which is transmitted in the first OFDM symbol of a subframe, carries information about the number of OFDM symbols, (i.e. the size of a control region), used for transmission of control channels within the subframe. Control information transmitted through the PDCCH is referred to as Downlink Control Information (DCI). The DCI indicates UL resource allocation information, DL resource allocation information, and a UL transmit power control command for certain UE groups. The PHICH carries an Acknowledgement (ACK)/Negative-Acknowledgement (NACK) signal for UL Hybrid Automatic Repeat Request (HARQ). Namely, the ACK/NACK signal for UL data transmitted by a UE is transmitted through the PHICH.

Now, a PDCCH, which is a DL physical channel, is described. For a detailed description of the PDCCH, reference is made to FIGS. 5 to 8.

A BS may transmit, through the PDCCH, PDSCH resource allocation and transport format (this is called a DL grant), PUSCH resource allocation information (this is called a UL grant), a set of transmit power control commands for a certain UE or individual UEs in a UE group, and activation of a Voice over Internet Protocol (VoIP). A plurality of PDCCHs may be transmitted within the control region and a UE may monitor the plurality of PDCCHs. The PDCCH consists of an aggregation of one or several contiguous Control Channel Elements (CCEs).

The PDCCH consisting of an aggregation of one or several contiguous CCEs may be transmitted through the control region after sub-block interleaving. A CCE is a logical allocation unit used to provide code rate to the PDCCH according to the state of a radio channel. The CCE corresponds to a plurality of resource element groups. A format of the PDCCH and the number of available bits of the PDCCH are determined according to a correlation between the number of CCEs and the code rate provided by the CCEs.

Control information transmitted through the PDCCH is referred to as DCI. The following Table 1 shows DCI according to a DCI format.

TABLE 1

| DCI format | Description |
| --- | --- |
| DCI format 0 | Used for scheduling of PUSCH |
| DCI format 1 | Used for scheduling of one PDSCH codeword |
| DCI format 1A | Used for compact scheduling of one PDSCH codeword and random access procedure initiated by a PDCCH order |
| DCI format 1B | Used for compact scheduling of one PDSCH codeword with precoding information |
| DCI format 1C | Used for very compact scheduling of one PDSCH codeword |
| DCI format 1D | Used for compact scheduling of one PDSCH codeword with precoding and power offset information |

TABLE 1-continued

| DCI format | Description |
| --- | --- |
| DCI format 2 | Used for scheduling PDSCH to UEs configured in closed-loop spatial multiplexing mode |
| DCI format 2A | Used for scheduling PDSCH to UEs configured in open-loop spatial multiplexing mode |
| DCI format 3 | Used for transmission of TPC commands for PUCCH and PUSCH with 2-bit power adjustments |
| DCI format 3A | Used for transmission of TPC commands for PUCCH and PUSCH with single bit power adjustments |

DCI format 0 indicates UL resource allocation information. DCI formats 1 and 2 indicate DL resource allocation information. DCI formats 3 and 3A indicate UL Transmit Power Control (TPC) commands for certain UE groups.

A method for a BS to map resources for PDCCH transmission in a 3GPP LTE system is briefly described.

Generally, the BS may transmit scheduling allocation information and other control information through the PDCCH. A physical control channel may be transmitted on an aggregate of one or plural consecutive CCEs. One CCE includes 9 REGs. The number of REGs which are not allocated to a PCFICH or PHICH is $N_{REG}$. CCEs from 0 to $N_{CCE-1}$ are available to a system (where $N_{CCE} = \lfloor N_{REG}/9 \rfloor$) The PDCCH supports multiple formats as shown in the following Table 2. One PDCCH consisting of n contiguous CCEs starts from a CCE performing i mode n=0 (where i is a CCE number). Multiple PDCCHs may be transmitted in one subframe.

TABLE 2

| PDCCH format | Number of CCEs | Number of resource element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, the BS may determine a PDCCH format depending on to how many regions control information is to be transmitted. A UE may reduce overhead by reading control information in units of CCEs. Similarly, an RN may read control information in units of Relay-CCEs (R-CCEs). In an LTE-A system, Resource Elements (REs) may be mapped in units of Relay-CCEs (R-CCEs) to transmit an R-PDCCH for a certain RN.

Referring to FIG. 3(b), a UL subframe may be divided into a control region and a data region in a frequency domain. A PUCCH is allocated to the control region to deliver UL control information. A PUSCH is allocated to the data region to deliver user data. To maintain a single carrier characteristic, one UE does not simultaneously transmit the PUCCH and the PUSCH. A PUCCH for one UE may be allocated to a Resource Block (RB) pair in one subframe. RBs belonging to the RB pair occupy different subcarriers in two slots. The RB pair to which the PUCCH is allocated is frequency-hopped at a slot boundary.

DL Time-Frequency Resource Grid Structure

Figure 4:
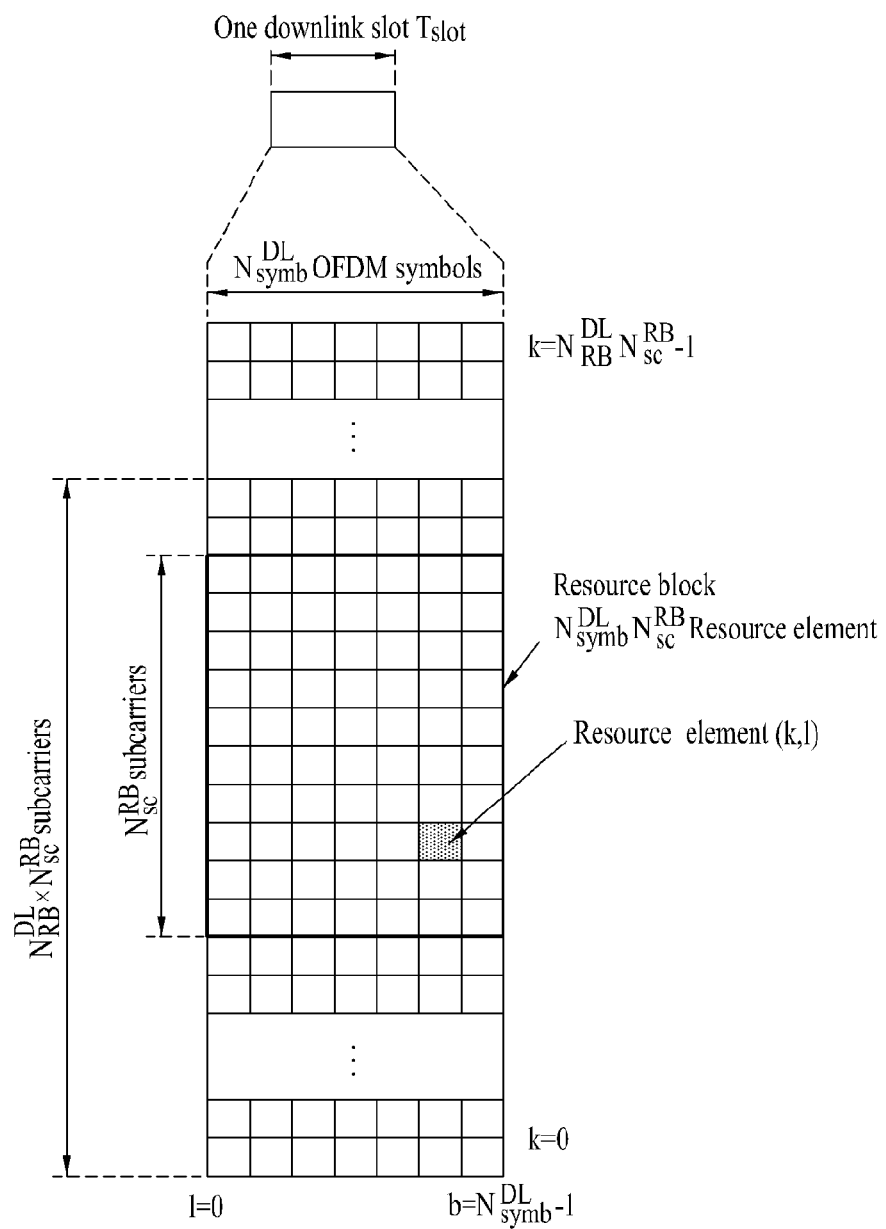
FIG. 4 is a diagram showing a DL time-frequency resource grid structure used in the present invention.

FIG. 4 is a diagram showing a DL time-frequency resource grid structure used in the present invention.

A DL signal transmitted in each slot uses a resource grid structure including $N_{RB}^{DL} \times N_{SC}^{RB}$ subcarriers and $N_{symb}^{DL}$ OFDM symbols, wherein $N_{RB}^{DL}$ denotes the number of RBs in DL, $N_{SC}^{RB}$ denotes the number of subcarriers constituting one RB, and $N_{symb}^{DL}$ denotes the number of OFDM symbols in one DL slot. The size of $N_{RB}^{DL}$ varies according to a DL transmission bandwidth configured within a cell and should satisfy $N_{RB}^{min,DL} \leq N_{RB}^{DL} \leq N_{RB}^{max,DL}$, wherein $N_{RB}^{min,DL}$ denotes the smallest DL bandwidth supported by the wireless communication system and $N_{RB}^{max,RB}$ denotes the largest DL bandwidth supported by a wireless communication system. $N_{RB}^{min,DL}$ may be set to 6 and $N_{RB}^{max,RB}$ may be set to 110. However, the scopes of $N_{RB}^{min,DL}$ and $N_{RB}^{max,RB}$ are not limited thereto. The number of OFDM symbols included in one slot may vary according to the length of a Cyclic Prefix (CP) and the spacing between subcarriers. In case of multi-antenna transmission, one resource grid may be defined per antenna port.

Each element in the resource grid for each antenna port is called an RE and is uniquely identified by an index pair (k, l) in a slot, wherein k is a frequency-domain index having any one value of 0 to $N_{RB}^{DL}N_{SC}^{RB}-1$ and l is a time-domain index having any one value of 0 to $N_{symb}^{DL}-1$.

The RB shown in FIG. 4 is used to describe a mapping relationship between any physical channel and REs. The RB may be divided into a Physical Resource Block (PRB) and a Virtual Resource Block (VRB). One PRB is defined as $N_{symb}^{DL}$ consecutive OFDM symbols in the time domain and $N_{SC}^{RB}$ consecutive subcarriers in the frequency domain, wherein $N_{symb}^{DL}$ and $N_{SC}^{RB}$ may be predetermined. For example, $N_{symb}^{DL}$ and $N_{SC}^{RB}$ may be given as shown in the following Table 3. Accordingly, one PRB includes $N_{symb}^{DL} \times N_{SC}^{RB}$ REs. Although one PRB may correspond to one slot in the time domain and to 180 kHz in the frequency domain, the PRB is not limited thereto.

TABLE 3

| Configuration | | $N_{SC}^{RB}$ | $N_{symb}^{DL}$ |
| --- | --- | --- | --- |
| Normal cyclic prefix | Δf = 15 kHz | 12 | 7 |
| Extended cyclic prefix | Δf = 15 kHz | | 6 |
| | Δf = 7.5 kHz | 24 | 3 |

PRBs are numbered from 0 to $N_{RB}^{SL}-1$ in the frequency domain. A relationship between a PRB number $n_{PRB}$ and an RE (k,l) in a slot in the frequency domain satisfies $$n_{PRB} = \left\lfloor \frac{k}{N_{SC}^{RB}} \right\rfloor.$$

The size of the VRB is the same as the size of the PRB. VRBs may be divided into Localized VRBs (LVRBs) and Distributed VRBs (DVRBs). For each type of VRB, a pair of VRBs over two slots in one subframe is allocated together with a single VRB number $n_{VRB}$.

The size of the VRB may be the same as the size of the PRB. Two types of VRBs are defined, the first one being localized VRBs (LVRBs) and the second one being distributed VRBs (DVRBs). For each type of VRB, a pair of VRBs is allocated over two slots in one subframe with a single VRB index (which may, hereinafter, be referred to as a VRB number). In other words, $N_{RB}^{DL}$ VRBs belonging to a first slot of two slots constituting one subframe are each allocated any one index of 0 to $N_{RB}^{LD}-1$ and $N_{RB}^{DL}$ VRBs belonging to a second slot of two slots are likewise each allocated any one index of 0 to $N_{RB}^{DL}-1$.

The above-described radio frame structure, DL and UL subframes, and DL time-frequency resource grid structure shown in FIG. 2 to FIG. 4 may also be applied between a BS and an RN.

Configuration of PDCCH

Hereinafter, a process for a BS to transmit a PDCCH to a UE in an LTE system will be described.

Figure 5:
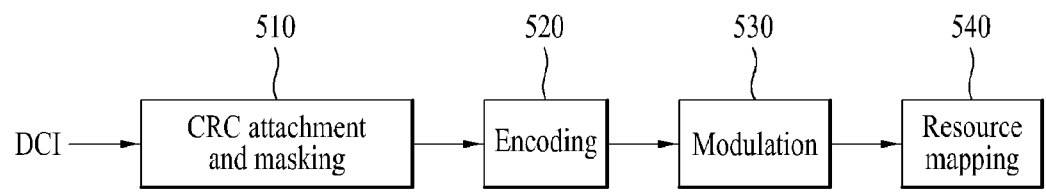
FIG. 5 is a block diagram illustrating the configuration of a PDCCH.

FIG. 5 is a block diagram illustrating the configuration of the PDCCH.

The BS determines a PDCCH format according to DCI to be transmitted to the UE, attaches a Cyclic Redundancy Check (CRC) to the DCI, and masks a unique identifier (this is called a Radio Network Temporary Identifier (RNTI)) to the CRC according to an owner or usage of the PDCCH (step 510).

If the PDCCH is for a specific UE, a unique identifier of the UE, for example, a Cell-RNTI (C-RNTI) may be masked to the CRC. Alternatively, if the PDCCH is for a paging message, a paging indicator identifier, for example, a Paging-RNTI (P-RNTI) may be masked to the CRC. If the PDCCH is for system information, a system information identifier, for example, a System Information RNTI (SI-RNTI) may be masked to the CRC. To indicate a random access response that is a response to transmission of a random access preamble of the UE, a Random Access-RNTI (RA-RNTI) may be masked to the CRC. To indicate a Transmit Power Control (TPC) command for each of a plurality of UEs, a TPC-RNTI may be masked to the CRC.

If the C-RNTI is used, the PDCCH carries control information for a corresponding specific UE, (this is referred to as UE-specific control information), and if other RNTIs are used, the PDCCH carries common control information received by all or plural UEs in a cell.

The CRC-attached DCI is encoded to generate coded data (step 520). Encoding includes channel encoding and rate matching.

The coded data is modulated to generate modulated symbols (step 530).

The modulated symbols are mapped to physical REs (step 540). Each of the modulated symbols is mapped to an RE.

Exemplary Resource Mapping of PDCCH

Figure 6:
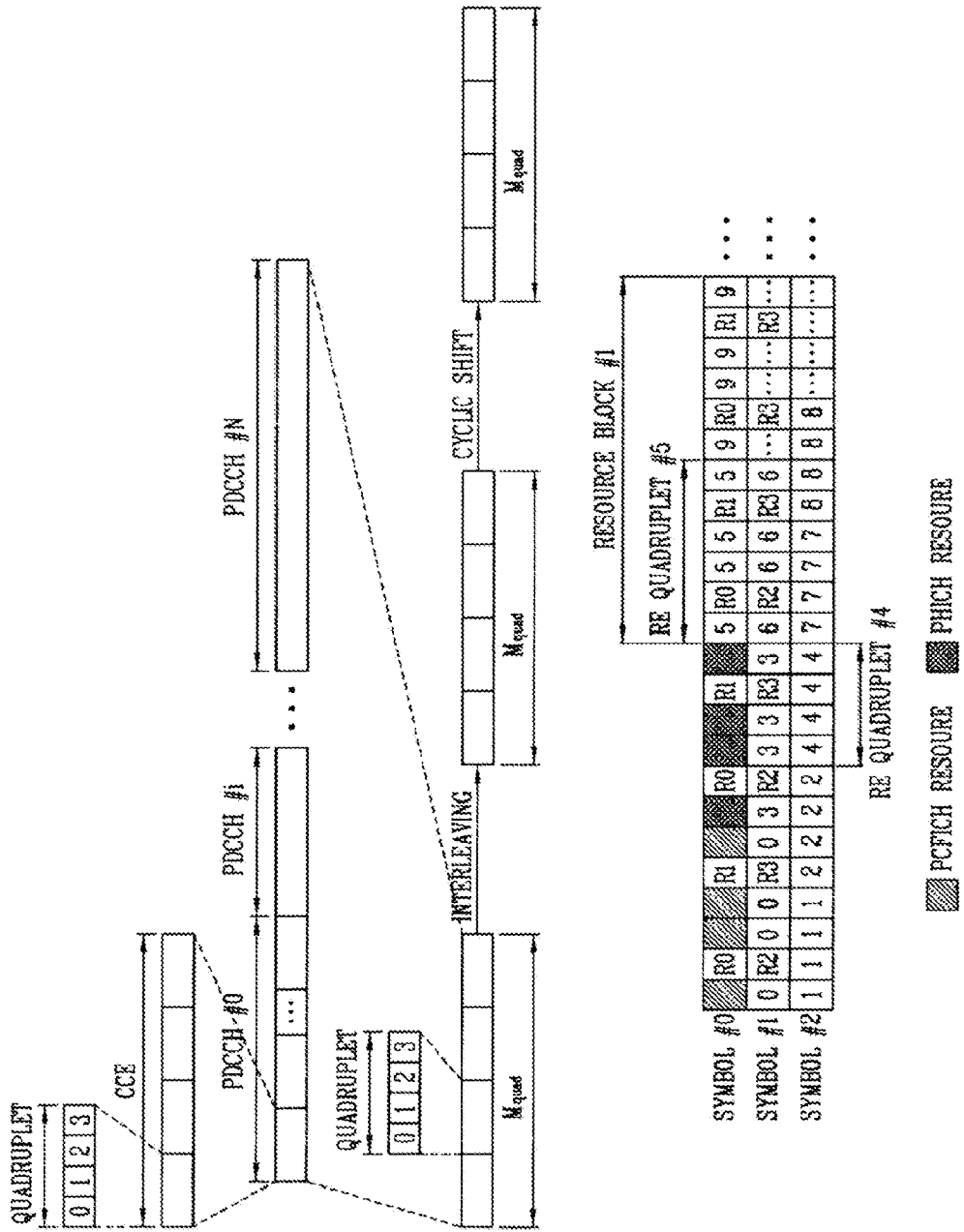
FIG. 6 shows exemplary resource mapping of a PDCCH.

FIG. 6 shows exemplary resource mapping of a PDCCH.

Referring to FIG. 6, R0, R1, R2, R3 denote reference signals of first, second, third, and fourth antennas, respectively.

A control region in a subframe includes a plurality of CCEs. The CCE is a logical allocation unit used to provide code rate to the PDCCH according to the state of a radio channel and corresponds to a plurality of Resource Element Groups (REGs). A format of the PDCCH and the number of available bits of the PDCCH are determined according to a correlation between the number of CCEs and the code rate provided by the CCEs.

One REG (indicated by quadruplet in FIG. 6) includes 4 REs and one CCE includes 9 REGs. 1, 2, 4, or 8 CCEs may be used to constitute one PDCCH and each element of {1, 2, 4, 8} is referred to as a CCE aggregation level.

A control channel comprised of one or more CCEs performs interleaving on an REG basis and is mapped to a physical resource after performing cyclic shift based on a cell ID.

Exemplary CCE Distribution of CCEs on System Band

Figure 7:
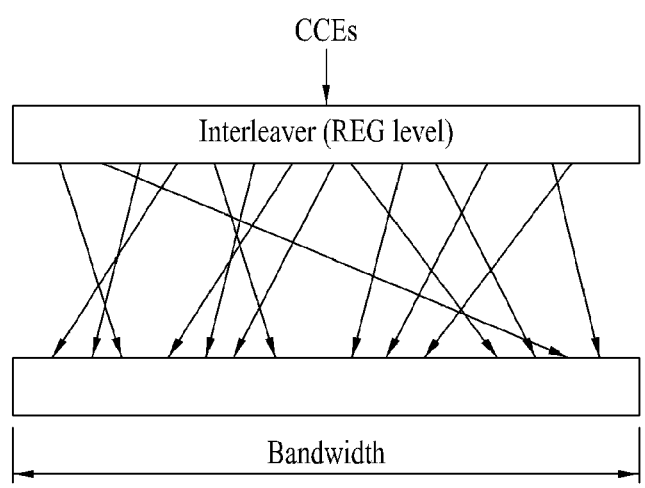
FIG. 7 shows exemplary CCE distribution on a system band.

FIG. 7 shows exemplary CCE distribution on a system band.

Referring to FIG. 7, a plurality of logically contiguous CCEs is input to an interleaver. The interleaver serves to mix a plurality of input CCEs on an REG basis.

Hence, frequency/time resources constituting one CCE are distributed in a manner of being physically scattered in a whole frequency/time domain within a control region of a subframe. Although a control channel is constructed in a CCE unit, interleaving is performed in the REG unit. Therefore, frequency diversity and interference randomization gain can be maximized.

Exemplary Monitoring of PDCCH

Figure 8:
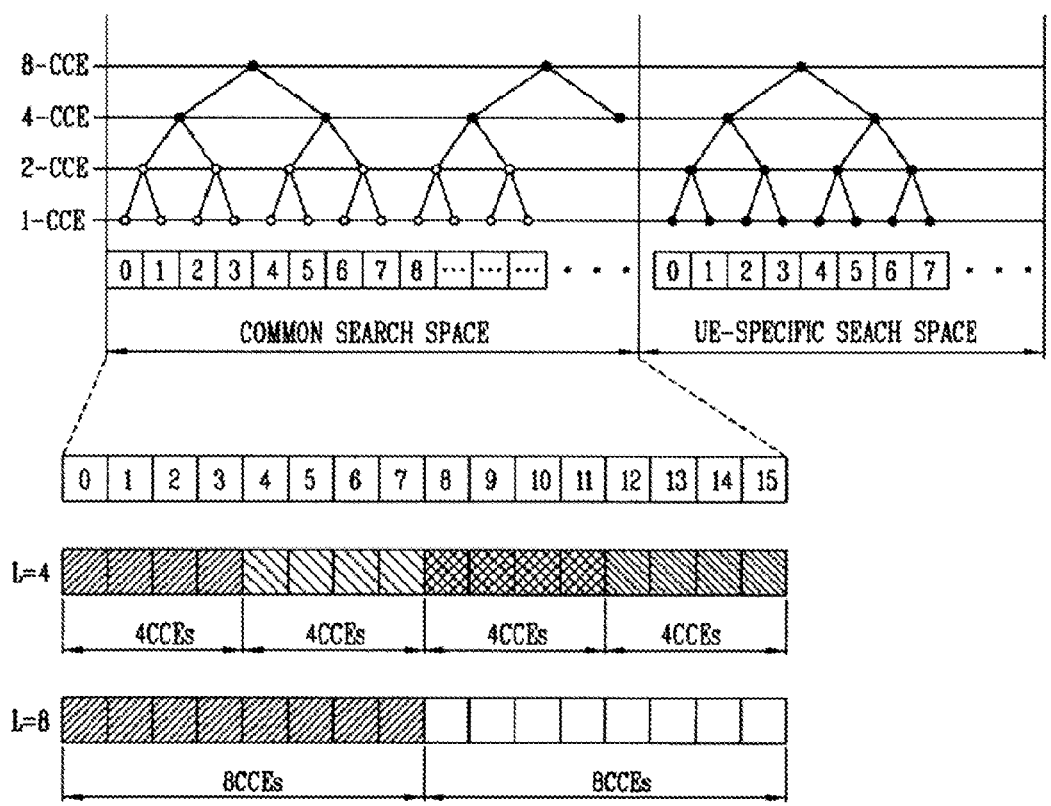
FIG. 8 shows exemplary monitoring of a PDCCH.

FIG. 8 shows exemplary monitoring of a PDCCH.

In 3GPP LTE, blind decoding is used to detect the PDCCH. Blind decoding is a method for demasking a desired identifier on a CRC of a received PDCCH (which is referred to as a candidate PDCCH) to check a CRC error and thus a UE determines whether or not the corresponding PDCCH is a control channel thereof. The UE cannot know at which position in the control region the PDCCH thereof is transmitted by using which CCE aggregation level or DCI format.

A plurality of PDCCHs may be transmitted in one subframe. The UE monitors a plurality of PDCCHs in every subframe. Here, monitoring refers to attempting, by the UE, to decode the PDCCH according to the monitored PDCCH format.

In 3GPP LTE, a search space is used to reduce the burden due to blind decoding. The search space may be a monitoring set of the CCE for the PDCCH. The UE monitors the PDCCH within a corresponding search space.

The search space is classified into a common search space and a UE-specific search space. The common search space is a space for searching for a PDCCH having common control information. The common search space is comprised of 16 CCEs of CCE indexes 1 to 15 and supports a PDCCH having a CCE aggregation level of {4, 8}. However, a PDCCH (DCI formats 0 and 1A) carry UE-specific information may also be transmitted in the common search space. The UE-specific search space supports a PDCCH having a CCE aggregation level of {1, 2, 4, 8}.

The following Table 4 shows the number of PDCCHs monitored by the UE.

TABLE 4

| Search Space Type | Aggregation level L | Size [in CCEs] | Number of PDCCH candidates | DCI formats |
| --- | --- | --- | --- | --- |
| UE-specific | 1 | 6 | 6 | 0, 1, 1A, 1B, 1D, 2, 2A |
| | 2 | 12 | 6 | |
| | 4 | 8 | 2 | |
| | 8 | | 2 | |
| Common | 4 | 16 | 4 | 0, 1A, 1C, 3/3A |
| | 8 | | 2 | |

The size of the search space is determined by Table 4 and the start point of the search space is different in the common search space and in the UE-specific search space. Although the start point of the common search space is fixed irrespective of a subframe. The start point of the UE-specific search space may vary with a UE identifier (e.g. C-RNTI), a CCE aggregation level, and/or a slot number in a radio frame. If the UE-specific search space is within the common search space, the UE-specific search space and the common search space may overlap.

A search space $S^{(L)}_k$ at aggregation level $L \in \{1, 2, 4, 8\}$ is defined by a set of PDCCH candidates. The CCEs corresponding to PDCCH candidate m of the search space $S^{(L)}_k$ are given by:

$$LE\{(Y_k+m)\bmod{}^*N_{CCE,k}/L+\}+i \quad \text{Equation 1}$$

where i=0, 1, ..., L−1, m=0, ..., $M^{(L)}$−1, and $N_{CCE,k}$ is the total number of CCEs which can be used for PDCCH transmission in a control region of a subframe k. The control region includes a set of CCEs numbered from 0 to $N_{CCE,k-1}$. $M^{(L)}$ is the number of PDCCH candidates at a CCE aggregation level L in a given search space. In the common search space, $Y_k$ is set to for two aggregation levels, L=4 and L=8. In the UE-specific search space of the aggregation level L, the parameter $Y_k$ is defined as:

$$Y_k = (AEY_{k-1}) \bmod D \qquad \text{Equation 2}$$

where Y−1=nRNTI≠0, A=39827, D=65537, k=floor(ns/2), and $n_s$ is a slot number within a radio frame.

When a UE monitors a PDCCH using C-RNTI, the DCI format and the search space to be monitored are determined according to transmission mode of a PDSCH. The following table shows an example of monitoring of the PDCCH in which C-RNTI is set.

TABLE 5

| Transmission Mode | DCI format | Search space | Transmission mode of PDSCH according to PDCCH |
|---|---|---|---|
| Mode 1 | DCI format 1A | Common and UE-specific | Single antenna port, port 0 |
|  | DCI format 1 | UE-specific | Single antenna port, port 0 |
| Mode 2 | DCI format 1A | Common and UE-specific | Transmit diversity |
|  | DCI format 1 | UE-specific | Transmit diversity |
| Mode 3 | DCI format 1A | Common and UE-specific | Transmit diversity |
|  | DCI format 2A | UE-specific | Cyclic Delay Diversity (CDD) or transmit diversity |
| Mode 4 | DCI format 1A | Common and UE-specific | Transmit diversity |
|  | DCI format 2 | UE-specific | Closed-loop spatial multiplexing |
| Mode 5 | DCI format 1A | Common and UE-specific | Transmit diversity |
|  | DCI format 1D | UE-specific | Multi-user Multiple Input Multiple Output (MU-MIMO) |
| Mode 6 | DCI format 1A | Common and UE-specific | Transmit diversity |
|  | DCI format 1B | UE-specific | Closed-loop spatial multiplexing |
| Mode 7 | DCI format 1A | Common and UE-specific | If the number of PBCH transmission ports is 1, then single antenna port, port 0, and otherwise, transmit diversity |
|  | DCI format 1 | UE-specific | Single antenna port, port 5 |
| Mode 8 | DCI format 1A | Common and UE-specific | If the number of PBCH transmission ports is 1, then single antenna port, port 0, and otherwise, transmit diversity |
|  | DCI format 2B | UE-specific | Dual layer transmission (port 7 or 8), or single antenna port, port 7 or 8 |

Single Carrier Communication

Figure 9:
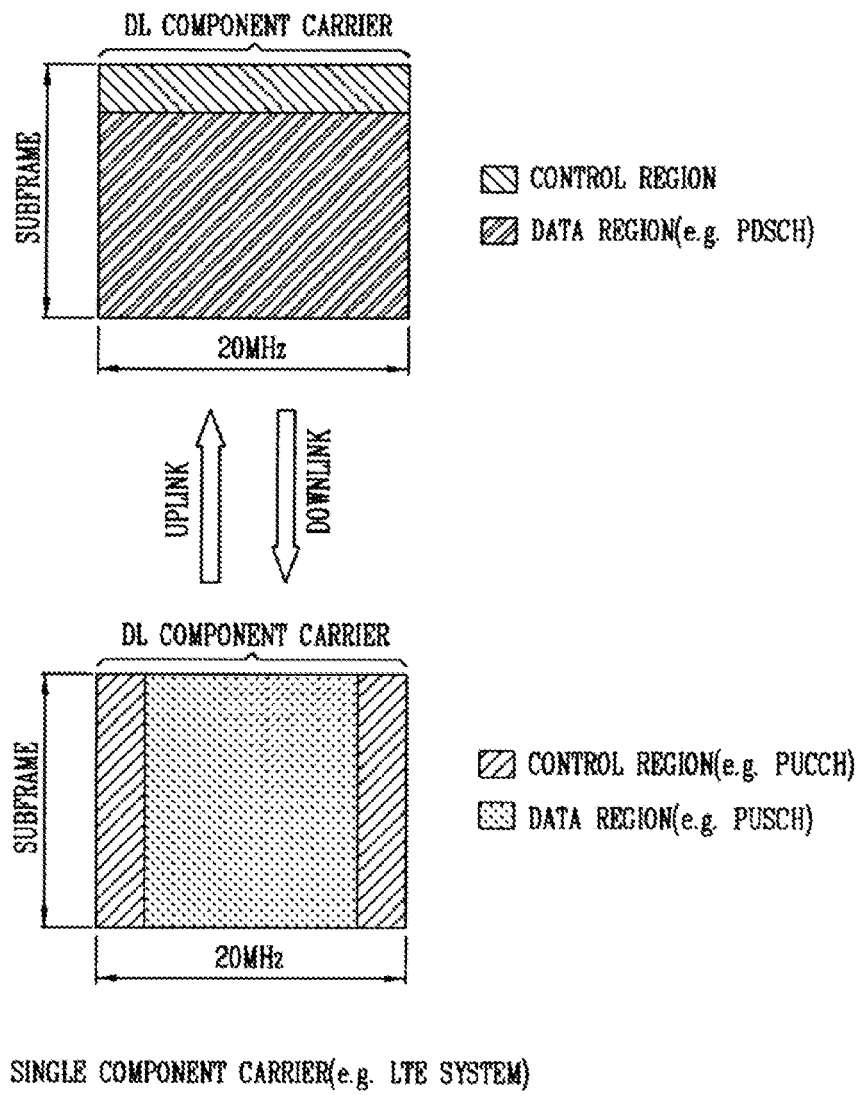
FIG. 9 shows exemplary communication in a single carrier situation.

FIG. 9 shows exemplary communication in a single carrier situation. FIG. 9 may correspond to an example of communication in an LTE system.

Referring to FIG. 9, a general FDD wireless communication system transmits and receives data through one DL band and one UL band corresponding to the DL band. A BS and a UE exchange data and/or control information scheduled in a subframe unit. The data is transmitted and received through a data region configured in UL/DL subframes and the control information is transmitted and received through a control region configured in the UL/DL subframes. To this end, the UL/DL subframes carry signals on various physical channels. Although a description of FIG. 9 is given based on an FDD scheme for convenience, the above description may also be applied to a TDD scheme by dividing a radio frame into UL and DL frames in the time domain.

Multicarrier Communication

Figure 10:
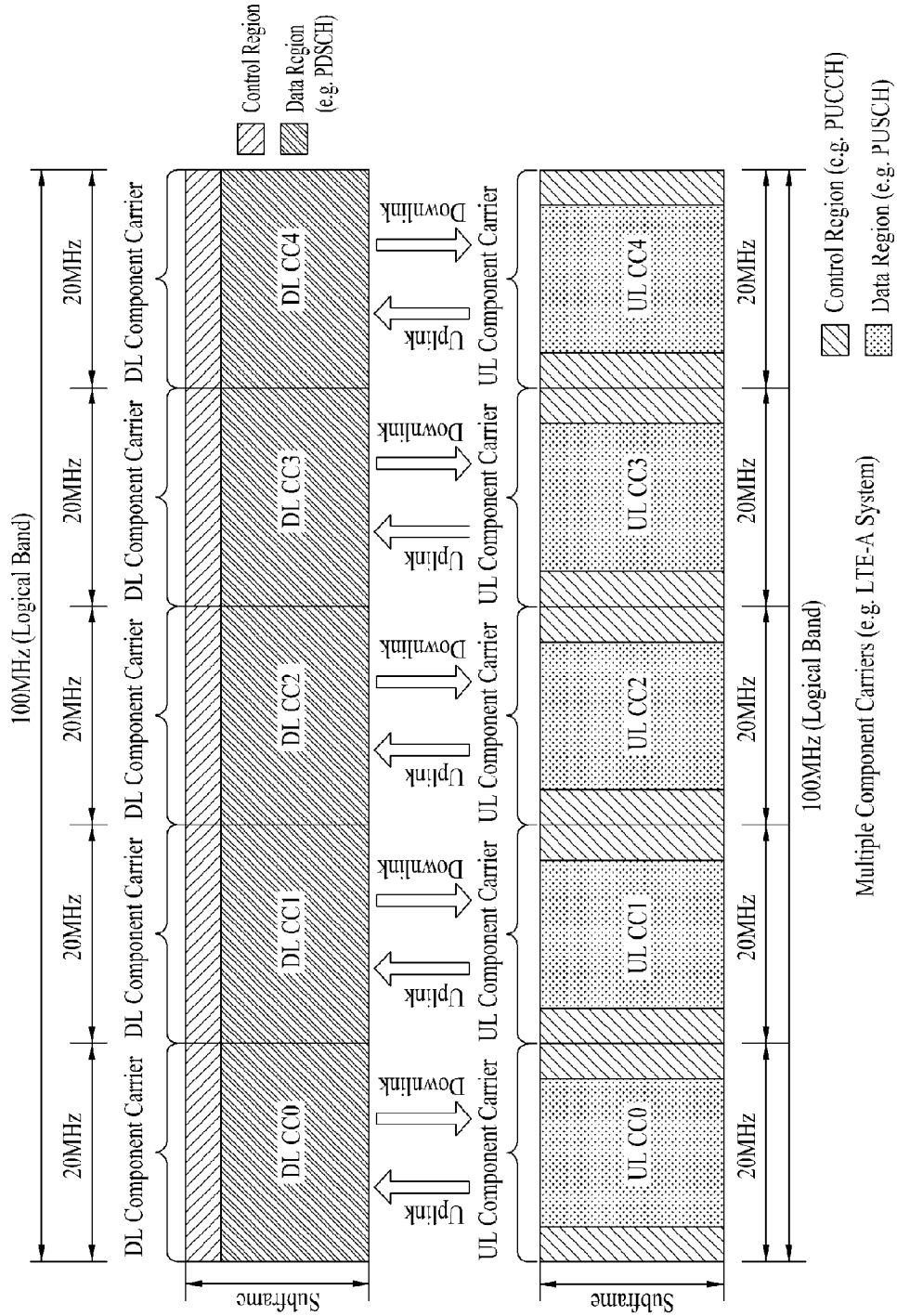
FIG. 10 shows exemplary communication in a multicarrier situation.

FIG. 10 shows exemplary communication in a multicarrier situation.

An LTE-A system uses carrier aggregation or bandwidth aggregation that uses a wider UL/DL bandwidth by aggregating a plurality of UL/DL frequency blocks in order to employ a wider frequency band. A multicarrier system or Carrier Aggregation (CA) system refers to a system using carriers by aggregating a plurality of carriers each having a narrower bandwidth than a target bandwidth, for broadband support. When a plurality of carriers having a narrower bandwidth than a target bandwidth is aggregated, the bandwidth of the aggregated carriers may be limited to a bandwidth used in a legacy system in order to maintain backward compatibility with the legacy system. For example, an LTE system may support bandwidths of 1.4, 3, 5, 10, 15, and 20 MHz and an LTE-Advanced (LTE-A) system improved from the LTE system may support bandwidths wider than 20 MHz using the bandwidths supported in the LTE system. In addition, a new bandwidth may be defined to support CA irrespective of bandwidth used in the legacy system. The term multicarrier is interchangeably used with CA and bandwidth aggregation. Contiguous CA and non-contiguous CA are collectively referred to as CA. For reference, when only one Component Carrier (CC) is used for communication in TDD, this corresponds to communication in the single carrier situation (non-CA) of FIG. 8. A UL CC and a DL CC are called UL resources and DL resources, respectively.

For example, referring to FIG. 10, five CCs of each 20 MHz may be aggregated on each of UL and DL to support a bandwidth of 100 MHz. The respective CCs may be contiguous or non-contiguous in a frequency domain. For convenience, FIG. 10 shows the case in which the bandwidth of a UL CC is the same as the bandwidth of a DL CC and the two are symmetrical. However, the bandwidth of each CC may be independently determined. For example, the bandwidth of the UL CC may be configured in a manner of 5 MHz (UL CC0)+ 20 MHz (UL CC1)+20 MHz (UL CC2)+20 MHz (UL CC3)+5 MHz (UL CC4). It is also possible to configure asymmetric CA in which the number of UL CCs is different from the number of DL CCs. Asymmetric CA may be generated due to limitation of available frequency bands or may be intentionally formed by network configuration. For example, even when the BS manages X DL CCs, a frequency band which can be received by a specific UE may be limited to Y (≤X) DL CCs. In this case, the UE needs to monitor DL signals/data transmitted through the Y CCs. In addition, even when the BS manages L UL CCs, a frequency band which can be received by a specific UE may be limited to M (≥L) UL CCs. The limited DL CCs or UL CCs for a specific UE are called serving UL or DL CCs configured in a specific UE. The BS may allocate a prescribed number of CCs to the UE by activating some or all of the CCS managed by the BS or by deactivating some CCs managed by the BS. The BS may change the activated/deactivated CCs and change the number of activated/deactivated CCs. Meanwhile, the BS may cell-specifically or UE-specifically configure Z DL CCs (where 1≤Z≤Y≤X) that the UE should first monitor/receive as main DL CCs. Further, the BS may cell-specifically or UE-specifically configure N UL CCs (where 1≤N≤M≤L) that the UE should first transmit as main UL CCs. In this way, the restricted main DL or UL CCs for a specific UE are also called serving UL or DL CCs configured in a specific UE. Various parameters for CA may be configured cell-specifically, UE group-specifically, or UE-specifically.

Once the BS allocates available CCs to the UE cell-specifically or UE-specifically, at least one of the allocated CCs is not deactivated, unless overall CC allocation to the UE is reconfigured or the UE is handed over. Hereinafter, the CC which is not deactivated unless the overall CC allocation to the UE is reconfigured is referred to as a Primary CC (PCC) and a CC that the BS can freely activate/deactivate is referred to as a Secondary CC (SCC). Single carrier communication uses one PCC for communication between the UE and the BS and does not use the SCC for communication. Meanwhile, the PCC and SCC may be distinguished based on control information. For example, specific control information may be set to be transmitted and received only through a specific CC. Such specific control information may be referred to a PCC and the other CCs may be referred to as SCCs. For instance, control information transmitted through a PUCCH may correspond to such specific control information. Thus, if control information transmitted on the PUCCH can be transmitted to the BS from the UE only through the PCC, a UL CC in which the PUCCH of the UE is present may be referred to as a UL PCC and the other UL CCs may be referred to as UL SCCs. As another example, if a UE-specific CC is used, the specific UE may receive a DL Synchronization Signal (SS) from the BS as specific control information. In this case, a DL CC with which the specific UE establishes synchronization of initial DL time by receiving the DL SS (i.e. a DL CC used for attempting to access a network of the BS) may be referred to as a DL PCC and the other DL CCs may be referred to as DL SCCs. In a communication system according to LTE-A release-10, Multicarrier communication uses one PCC and no SCC or one or more SCCs per UE. However, this is definition according to LTE-A standard and communication using multiple PCCs per UE will be able to be permitted in the future. The PCC may be referred to as a primary CC, an anchor CC, or a primary carrier and the SCC may be referred to as a secondary CC or a secondary carrier.

LTE-A uses the concept of cells to manage radio resources. A cell is defined as a combination of DL resources and UL resources, that is, a DL CC and a UL CC. Here, the UL resources are not an indispensible component. However, this is definition in current LTE-A standard and, in the future, it may be permitted that a cell is configured using the UL resources alone. Accordingly, the cell can be configured with the DL resources alone, or with both the DL resources and UL resources. When CA is supported, linkage between carrier frequency of the DL resources (or DL CC) and carrier frequency of the UL resources (or UL CC) may be indicated by system information. For example, a combination of the DL resources and the UL resources may be indicated by a System Information Block type 2 (SIB2). Here, the carrier frequency refers to a center frequency of each cell or CC. A cell that operates on a primary frequency (or PCC) may be referred to as a Primary Cell (PCell) and a cell that operates on a secondary frequency (or SCC) may be referred to as a Secondary Cell (SCell). The primary frequency (or PCC) refers to a frequency (or CC) used for the UE to perform an initial connection establishment or connection re-establishment procedure. PCell may refer to a cell indicated during a handover process. The secondary frequency (or SCC) refers to a frequency (or CC) that is configurable after RRC connection setup is performed and is usable to provide additional radio resources. PCell and SCell may be collectively referred to as a serving cell. Accordingly, for a UE that is in an RRC_CO-NNECTED state without configuring CA or does not support CA, only one serving cell comprised of only the PCell is present. Meanwhile, for a UE in an RRC_CONNECTED state, for which CA is configured, one or more serving cells may be present and the whole serving cells may include one PCell and one or more SCells. However, in the future, it may be permitted that the serving cell includes a plurality of PCells. For CA, a network may configure one or more SCells for a UE that supports CA in addition to the PCell initially configured in the connection establishment procedure after an initial security activation procedure is initiated. However, even if the UE supports CA, the network may configure only the PCell for the UE, without adding the SCells. The PCell may be referred to as a primary CC, an anchor CC, or a primary carrier and the SCell may be referred to a secondary CC or a secondary carrier.

In a multicarrier system, the BS may transmit a plurality of data units to the UE in a given cell/cells (or CC) and the UE may transmit ACK/NACK signals for the plurality of data units in one subframe. The UE may be allocated one or plural cells (or DL CCs) for receiving a PDSCH for DL data reception. A cell/cells (or DL CCs) for the UE may be semi-statically configured or reconfigured by RRC signaling. Moreover, a cell/cells (or DL CCs) for the UE may be dynamically activated/deactivated by L1/L2 (Medium Access Control (MAC)) control signaling. Therefore, the maximum number of ACK/NACK bits to be transmitted by the UE varies with cells (or DL CCs) available to the UE. That is, the maximum number of ACK/NACK bits to be transmitted by the UE is configured/reconfigured by RRC or varies with activated DL CCs (or configured serving cells) by L1/L2 signaling.

Multiple MAC Layers and Multicarrier Management

Figure 11:
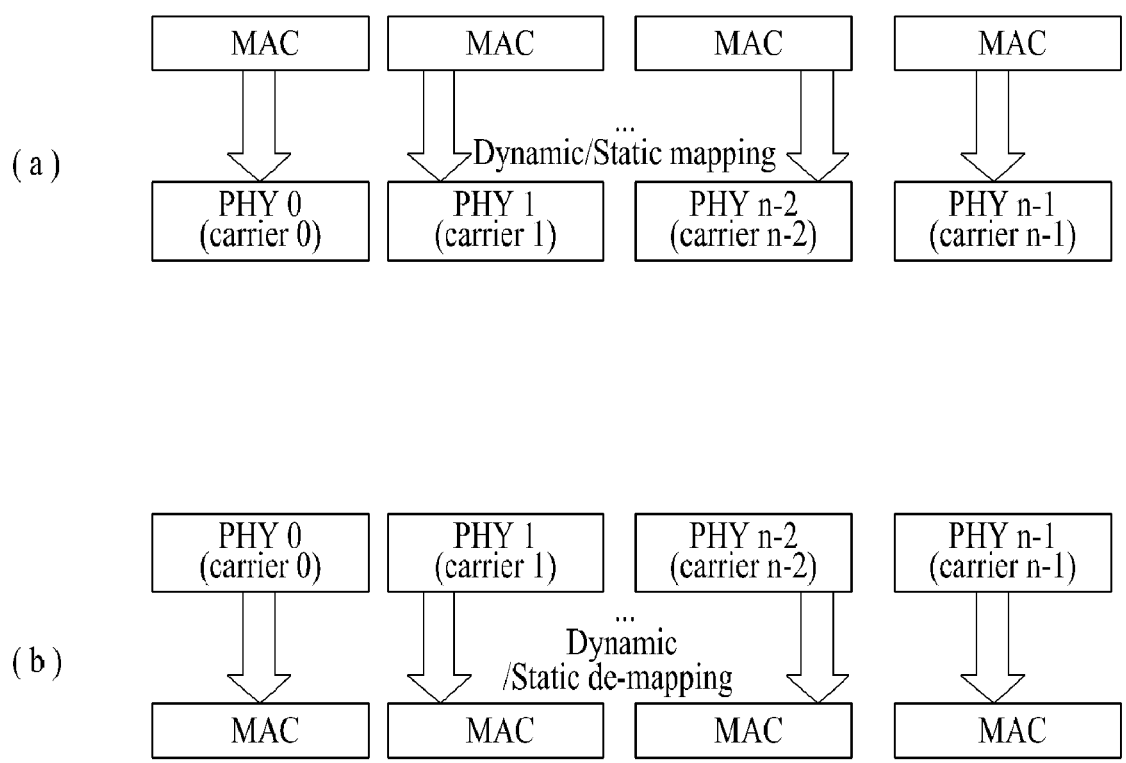
FIG. 11($a$) is a diagram explaining the concept that a plurality of MAC layers manages multiple carriers in a BS and FIG. 11($b$) is a diagram explaining the concept that a plurality of MAC layers manages multiple carriers in a UE.
Figure 12:
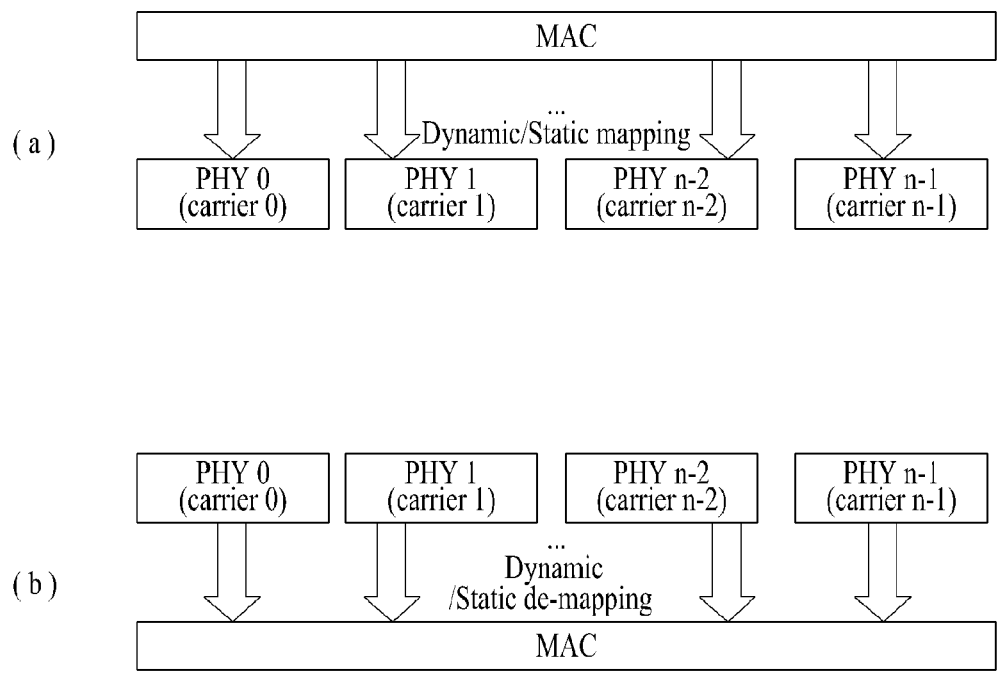
FIG. 12($a$) is a diagram explaining the concept that one MAC layer manages multiple carriers in a BS and FIG. 12($b$) is a diagram explaining the concept that one MAC layer manages multiple carriers in a UE.

The configuration of a physical layer (PHY) and a layer 2 (MAC) for transmission of a plurality of allocated UL or DL carrier bands from the viewpoint of a certain cell or UE may be indicated as in FIG. 11 and FIG. 12.

FIG. 11(a) is a diagram explaining the concept that a plurality of MAC layers manages multiple carriers in a BS and FIG. 11(b) is a diagram explaining the concept that a plurality of MAC layers manages multiple carriers in a UE.

As shown in FIG. 11(a) and FIG. 11(b), each MAC may control each carrier 1:1. In a system supporting multiple carriers, contiguous or non-contiguous carriers may be used, regardless of UL/DL. A TDD system is configured to manage N carriers each including DL and UL transmission and an FDD system is configured to respectively use multiple carriers in UL and DL. The FDD system may support asymmetric CA in which the numbers of aggregated carriers and/or the bandwidths of carriers in UL and DL are different.

One MAC Layer and Multicarrier Management

FIG. 12(a) is a diagram explaining the concept that one MAC layer manages multiple carriers in a BS and FIG. 12(b) is a diagram explaining the concept that one MAC layer manages multiple carriers in a UE.

Referring to FIGS. 12(a) and 12(b), one MAC layer manages one or more frequency carriers so as to perform transmission and reception. Since the frequency carriers managed by one MAC layer need not be contiguous, more flexible resource management is possible. In FIG. 12(a) and FIG. 12(b), one PHY means one CC for convenience. Here, one PHY does not necessarily mean an independent Radio Frequency (RF) device. In general, one independent RF device means one PHY but is not limited thereto. One RF device may include several PHYs.

A series of Physical Downlink Control Channels (PDCCHs) for transmitting control information of L1/L2 control signaling generated from a packet scheduler of a MAC layer supporting the configurations of FIG. 12(a) and FIG. 12(b) may be mapped to physical resources in a separate CC to be transmitted.

In this case, in particular, PDCCHs of channel assignment or grant-related control information associated with transmission of a PDSCH or Physical Uplink Shared Channel (PUSCH) specific to an individual UE are divided according to CCs on which the physical shared channel is transmitted, are encoded, and are generated as divided PDCCHs, which are referred to as separate coded PDCCHs.

As another method, control information for transmitting the physical shared channels of several CCs may be configured as one PDCCH to be transmitted, which is referred to as a joint coded PDCCH.

In order to support DL or UL CA, if a link is established such that a PDCCH and/or a PDSCH for transmitting data and control information are transmitted according to situations on a per specific UE or relay node basis or as a preparation process for establishing a link for transmitting the PDCCH and/or the PDSCH, a BS may assign CCs to be measured and/or reported. This is expressed by CC assignment for an arbitrary purpose.

At this time, the eNB may transmit CC assignment information through a series of UE-specific or RN-specific RRC signaling according to dynamic characteristics of control in the case in which the CC assignment information is controlled in L3 Radio Resource Management (RRM) or transmit CC assignment information through a series of PDCCHs as L1/L2 control signaling or through a series of dedicated physical control channels for transmitting only the control information.

Exemplary Multiple Carriers

Figure 13:
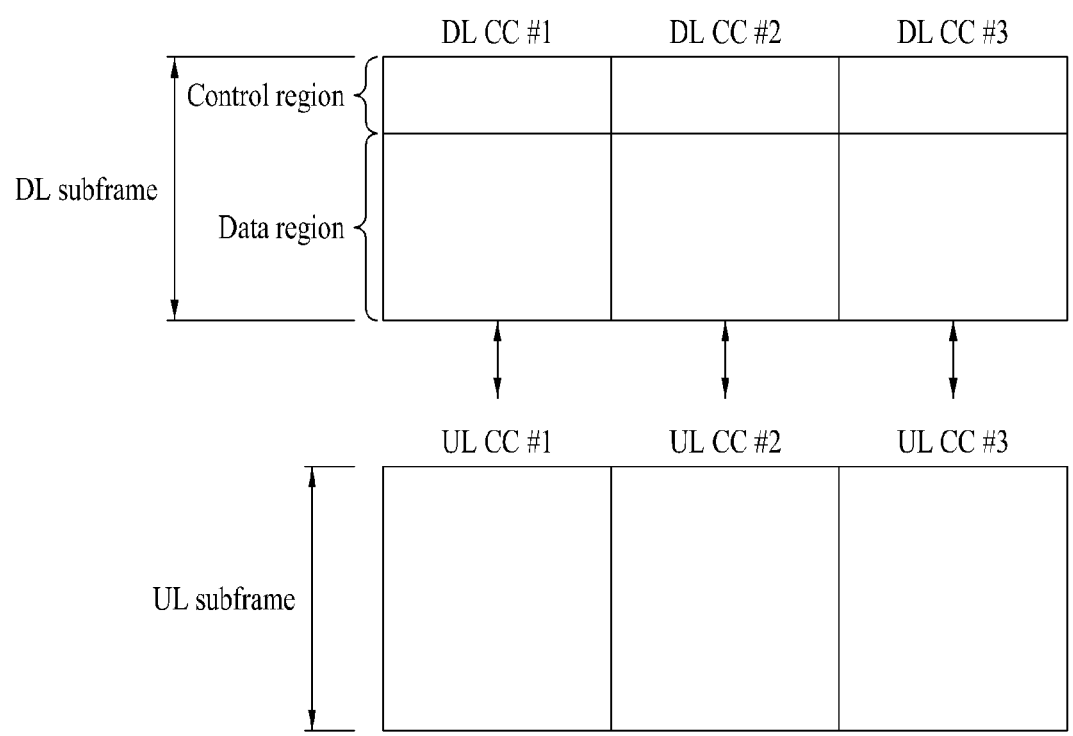
FIG. 13 shows exemplary multiple carriers.

FIG. 13 shows exemplary multiple carriers.

Three DL CCs and three UL CCs are shown but the numbers of DL CCs and UL CCs are not limited thereto. A PDCCH and a PDSCH are independently transmitted in respective DL CCs and a PUCCH and a PUSCH are independently transmitted in respective UL CCs.

Hereinbelow, a multiple carrier system refers to a system supporting multiple carriers based on spectrum aggregation as described previously.

In the multiple carrier system, contiguous aggregation and/or non-contiguous aggregation may be used and any one of symmetrical and asymmetrical aggregation may be used.

In the multiple carrier system, a linkage may be defined between a DL CC and a UL CC. The linkage may be configured based on E-UTRA Absolute Radio Frequency Channel Number (EARFCN) information included in DL system information and may be configured using a fixed DL/UL transmission (Tx)/reception (Rx) separation relationship. The linkage refers to a mapping relationship between a DL CC on which a PDCCH carrying an UL grant is transmitted and a UL CC using the UL grant.

Alternatively, the linkage may be a mapping relationship between a DL CC (or a UL CC) on which data for HARQ is transmitted and a UL CC (or a DL CC) on which HARQ ACK/NACK signals are transmitted. A BS may inform a UE of linkage information through a higher layer message, such as an RRC message, or part of system information. The linkage between the DL CC and the UL CC may be fixed but a linkage between cells/UEs may be changed.

A separate coded PDCCH refers to a case where the PDCCH is capable of carrying control information such as resource assignment for the PDSCH/PUSCH for one carrier. That is, the PDCCH and PDSCH, and PDCCH and PUSCH correspond respectively to each other 1:1. A joint coded PDCCH refers to a case in which one PDCCH is capable of carrying resource assignment for the PDSCH/PUSCH for multiple CCs. One PDCCH may be transmitted through one CC or through a plurality of CCs.

For convenience, separate coding is described based on PDCCH-PDSCH of a DL channel but the present invention can be applied to a PDCCH-PUSCH relationship.

In the multiple carrier system, two methods can be used for CC scheduling.

In the first method, a pair of PDCCH-PDSCH is transmitted on one CC. This CC is referred to as a self-scheduling CC, which implies that a UL CC through which a PUSCH is transmitted becomes a CC linked to a DL CC through which the corresponding PDCCH is transmitted. In other words, the PDCCH allocates a PDSCH resource on the same CC or allocates a PUSCH resource on the linked UL CC.

In the second method, a DL CC through which the PDSCH is transmitted or a UL CC through which the PUSCH is transmitted is determined irrespective of a DL CC through which the PDCCH is transmitted. That is, the PDCCH and the PDSCH are transmitted on different DL CCs or the PUSCH is transmitted on a UL CC not linked to the DL CC through which the PDCCH is transmitted, which is referred to as cross-carrier scheduling.

The CC through which the PDCCH is transmitted is called a PDCCH carrier, a monitoring carrier, or a scheduling carrier and the CC through which the PDSCH/PUSCH is transmitted is called a PDSCH/PUSCH carrier or a scheduled carrier.

Cross-carrier scheduling can be activated/deactivated for each UE and a cross-carrier scheduling activated UE can receive DCI including a CIF. The UE can be aware of which scheduled CC the control information is about, to which the PDCCH received from the CIF included in the DCI correspond.

A DL-UL linkage predefined by cross-carrier scheduling can be overridden. That is, cross-carrier scheduling can be used to schedule a different CC rather than the linked CC irrespective of the DL-UL linkage.

Exemplary Cross-Carrier Scheduling

Figure 14:
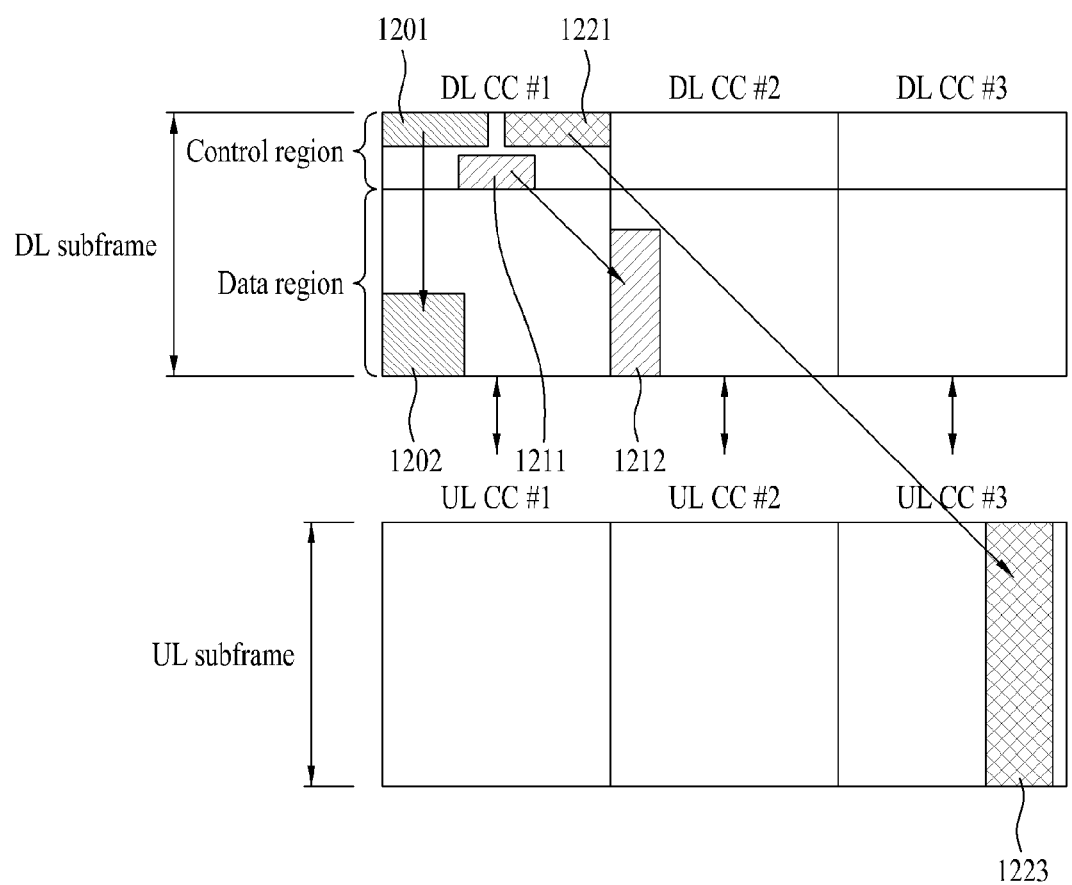
FIG. 14 shows exemplary cross-carrier scheduling.

FIG. 14 shows exemplary cross-carrier scheduling.

It is assumed that DL CC #1 is linked to UL CC #1, DL CC #2 is linked to UL CC #2, and DL CC #3 is linked to UL CC #3.

A first PDCCH 1201 of DL CC #1 carries DCI about a PDSCH 1202 of the same DL CC #1. A second PDCCH 1211 of DL CC #1 carries DCI about a PDSCH 1212 of DL CC #2. A third PDCCH 1221 of the DL CC #1 carries DCI about a PUSCH 1223 of UL CC #3 which is not linked.

For cross-carrier scheduling, the DCI of a PDCCH may include a CIF. A CIF indicates a DL CC or a UL CC scheduled through the DCI. For example, the second PDCCH 1211 may include a CIF indicating the DL CC #2. The third PDCCH 1221 may include a CIF indicating the UL CC #3.

Alternatively, the CIF of the third PDCCH 1221 may indicate a CIF corresponding to a DL CC rather than the CIF corresponding to a UL CC.

That is, the CIF of the third PDCCH 1221 may indirectly indicate UL CC #3 on which a PUSCH is scheduled by indicating DL CC #3 linked to the UL CC #3. If the DCI of a PDCCH includes PUSCH scheduling and the CIF indicates a DL CC, a UE can determine that the above situation corresponds to the PUSCH scheduling on a UL CC linked to the DL CC. Therefore, a larger number of CCs can be indicated than in a method for indicating all the DL/UL CCs using a CIF having a limited bit length (e.g. a CIF having three-bit length).

A UE using cross-carrier scheduling is required to monitor a PDCCH of a plurality of scheduled CCs with respect to the same DCI format in a control region of one scheduling CC. For example, if a plurality of DL CCs have different transmission modes, a plurality of PDCCHs having different DCI formats can be monitored in each DL CC. If the bandwidths of the DL CC are different from one another even when the same transmission mode is used, payload sizes of the DCI format are different under the same DCI format and a plurality of PDCCHs can be monitored.

Consequently, if cross-carrier scheduling is possible, a UE needs to monitor a PDCCH for a plurality of DCI in the control region of a monitoring CC according to the transmission mode and/or the bandwidth of each CC. Accordingly, it is necessary to construct a search space which can support PDCCH monitoring and to monitor the PDCCH.

First, in the multiple carrier system, the following terminology is defined.

A UE DL CC set: a set of DL CCs scheduled for a UE to receive a PDSCH.

A UE UL CC set: a set of UL CCs scheduled for a UE to transmit a PUSCH.

A PDCCH monitoring set: A set of at least one DL CC performing PDCCH monitoring. The PDCCH monitoring set may be the same as the UE DL CC set or a subset of the UE DL CC set. The PDCCH monitoring set may include at least one of DL CCs in the UE DL CC set. Alternatively, the PDCCH monitoring set may be defined separately, independently of the UE DL CC set. A DL CC included in the PDCCH monitoring set may be configured such that self-scheduling for a linked UL CC is always possible.

The UE DL CC set, the UE UL CC set, and the PDCCH monitoring set may be configured cell-specifically or UE-specifically.

As to in which DCI format the CIF is to be included is as follows.

If a CRC is scrambled to a P-RNTI, RA-RNTI, or TC-RNTI, the DCI format does not include a CIF.

DCI formats 0, 1, 1A, 1B, 1D, 2, 2A, and 2B receivable in a UE-specific search space may include a CIF if a CRC is scrambled (or masked) by a C-RNTI or SPS-RNTI.

CIF Configuration Method

Figure 15:
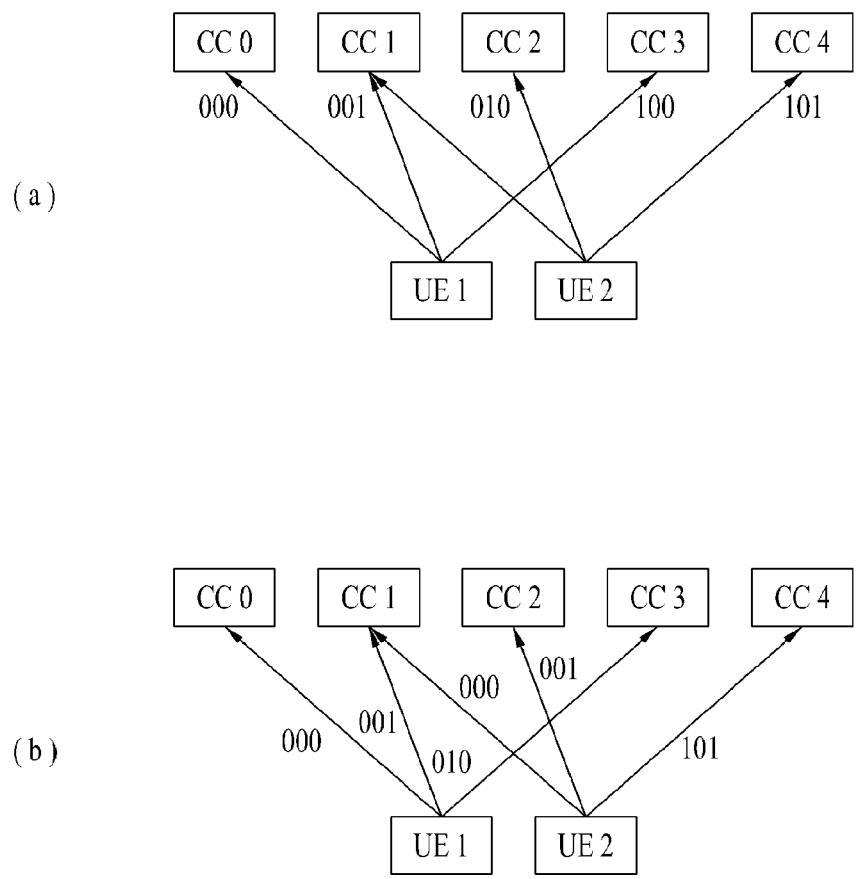
FIG. 15 and FIG. 16 show exemplary CIF configuration methods in a communication system according to embodiments of this disclosure.
Figure 16:
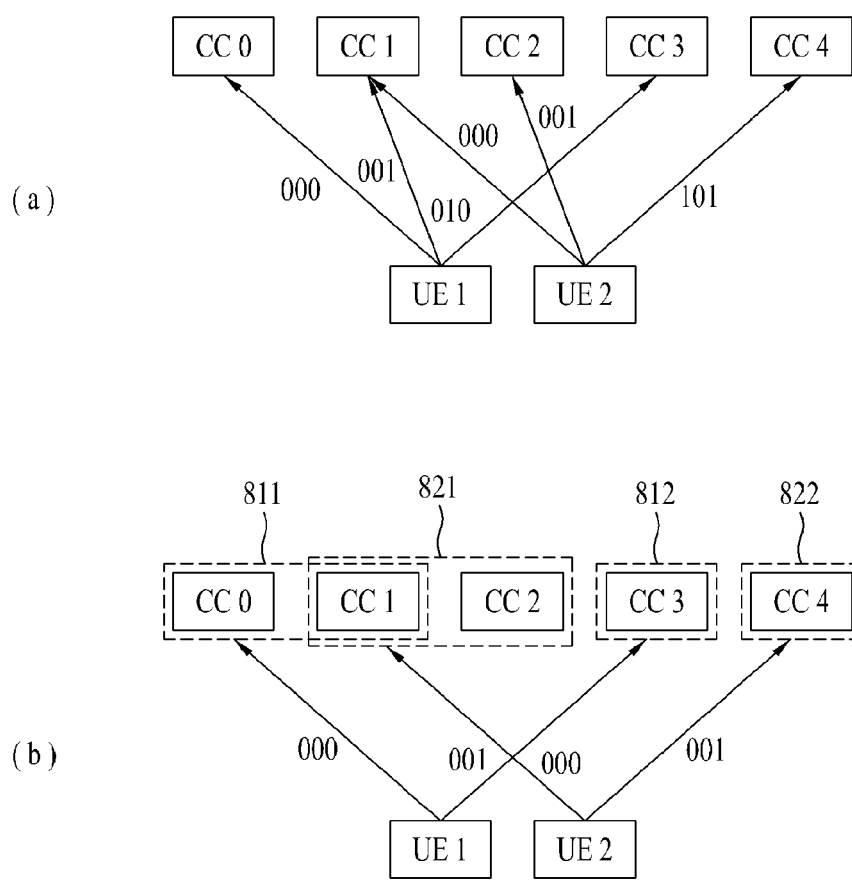

FIG. 15 and FIG. 16 show exemplary CIF configuration methods in a communication system according to embodiments of this disclosure.

Cross-carrier scheduling may be configured/released or activated/deactivated for each UE. If cross-carrier scheduling is activated for the UE, a CIF of a fixed length for supporting cross-carrier scheduling is included in a PDCCH DCI format of each UE. In this case, a CIF configuration method may include a cell-specific or UE-specific method.

Referring to FIG. 15(a), a cell-specific CIF configuration method is a method in which index numbers according to a CIF of a fixed length are assigned to all CCs in a cell. When a 3-bit fixed CIF is considered, one cell may be configured using 8 or more CCs that can be expressed by 3 bits. Accordingly, a BS can use a unified index for all UEs but a case may occur where the BS may not schedule all UEs only using the 3-bit CIF according to a cell configuration method.

Referring to FIG. 15(b), a UE-specific CIF configuration method is a method in which CCs are indexed according to CC configuration allocated to each UE. In accordance with the UE-specific configuration method, each UE assigns different index numbers to CCs in the cell and thus different index numbers assigned by UEs even to the same CC are indicated through a CIF.

UE-Specific CIF Configuration Method

The UE-specific CIF configuration method used in a communication system according to embodiments of this disclosure will be described below with reference to FIG. 16.

A first embodiment of this disclosure relates to a UE-specific CIF configuration method in which an index number per CC is assigned. The first embodiment is described with reference to FIG. 16(a).

Referring to FIG. 16(a), an index for configuring a CIF according to the UE-specific CIF configuration method is assigned per UE and is assigned to have a value corresponding to each CC. That is, according to the UE-specific CIF configuration method using each CC, a CIF corresponding to each CC may be designated with respect to one or more CCs allocated to the UE.

Meanwhile, in the UE-specific CIF configuration method, a CIF may be configured using a CC group consisting of one or more CCs. The CC group may include one or more CCs and each CC group may include the different number of CCs. The UE may be assigned one or more CC groups. The CC groups may be predesignated or may be configured through L1 or RRC signaling. When the CC groups are configured according to a determined rule, CCs having the same CC characteristics may belong to the same CC group. If the UE performs measurement and transmission for DL CCs, CCs may be grouped according to transmission/measurement/reporting mode. It is possible to regard all CCs as independent groups.

Meanwhile, a second embodiment according to this disclosure relates to the UE-specific CIF configuration method in which an index number is assigned per CC group. The second embodiment is described with reference to FIG. 16(b).

Referring to FIG. 16(b), a first CC group 811 and a second CC group 812 among CC groups 811, 812, 821, and 822 are allocated to a UE UE1 and a third CC group 821 and a fourth CC group 822 are allocated to a UE UE2. As described above, such CC groups may be predesignated or may be configured through L1 or RRC signaling.

For UE1, index numbers '000' and '001' are assigned to the first CC group 811 and the second CC group 812, respectively. As UE-specific CIF configuration, index numbers '000' and '001' for UE2 are assigned to the third CC group 821 and the fourth CC group 822, respectively.

According to the UE-specific CIF configuration method using such CC groups, indexes for configuring CIFs are assigned per UE but may be assigned to have values corresponding to CC groups each consisting of one or more CCs as opposed to the above-described first embodiment. In other words, one or more CCs allocated to a UE are grouped first and a CIF corresponding to each CC group may be designated. If the total number of CCs constructed by a UE is M and the number of CC groups of the UE is N, the relationship of M>=N is formed.

Meanwhile, the above-described first and second embodiments may be implemented through the following modification. Namely, in the modified embodiment, the UE-specific CIF configuration method using CC groups may be used through combination with the above-described UE-specific CIF configuration method using CCs.

With reference to the following table, for example, in consideration of the fixed length of a CIF and the number of CCs, a part of values constituting CIFs may be designated by distinguishing between values for CC groups and the other part of values constituting CIFs may be designated by values for individual CCs.

TABLE 6

| | Number of additionally designable CCs | | | |
|---|---|---|---|---|
| CIF | 2 | 3 | 4 | 5 |
| 000 | CC0 | CC0 | CC0 | CC0 |
| 001 | CC1 | CC1 | CC1 | CC1 |
| 010 | Reserved | CC1 | CC2 | CC2 |
| 011 | Reserved | Reserved | CC3 | CC3 |
| 100 | Reserved | Reserved | Reserved | CC4 |
| 101 | 3rd CC group | 3rd CC group | 3rd CC group | 3rd CC group |
| 110 | 2nd CC group | 2nd CC group | 2nd CC group | 2nd CC group |
| 111 | 1st CC group | 1st CC group | 1st CC group | 1st CC group |

In such a case, the number of additionally designable values among the values constituting the CIFs varies with the number of CCs. Accordingly, when designable CIF state values are present, CC groups may be additionally allocated to the remaining state values and such additional allocation of the CC groups may be performed through RRC signaling.

CIF Configuration Method During CC Deactivation

Hereinafter, the CIF configuration method will be described in the case in which specific CCs are deactivated in a communication system according to embodiments of this disclosure.

Figure 17:
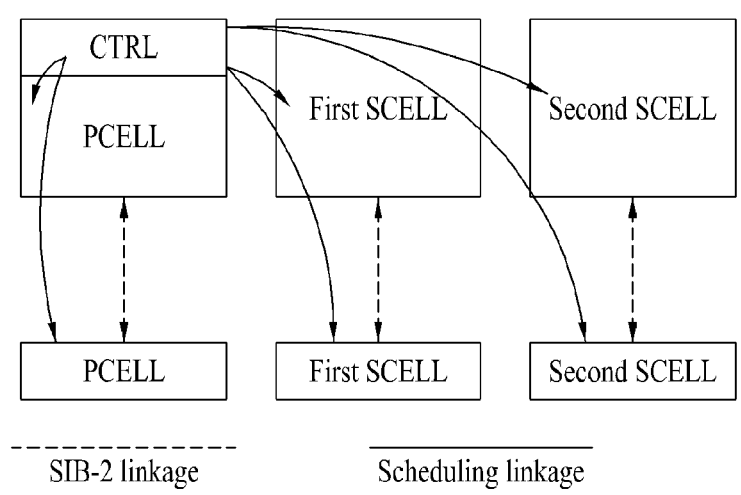
FIG. 17 shows exemplary CA configuration of a UE explaining a CIF configuration method during CC deactivation in a communication system according to embodiments of this disclosure.

The embodiments to be described relate to CIF configuration methods and particularly to a method for processing a CIF value allocated to a deactivated CC in the case in which some CCs are deactivated through MAC signaling of cross-carrier scheduling. PCell and Scells will be described below by way of example but the same description can be applied to CCs in general CA. FIG. 17 shows exemplary CA configuration of a UE explaining a CIF configuration method during CC deactivation in a communication system according to embodiments of this disclosure.

Referring to FIG. 17, it is assumed that one PCell and two Scells are allocated to a UE. That is, CA is configured such that a PCell, a first Scell, and a second SCell are allocated to the UE. When CA technology is applied as described previously, the PCell is a cell in which the UE performs a camping process and the SCells are cells except for the PCell among cells in which the UE can receive data.

Multiple carriers can be configured after RRC connection setup is performed. However, the Scells are in a deactivated state as a default state and may be changed to an activated state later by additional MAC signaling. Notably, the PCell is not deactivated and the SCells may receive signaling related to CA configuration through the PCell.

First, a UE performs initial access, such as cell search or random access, and RRC connection setup. Next, the BS informs the UE of CA configuration information according to UE capability through RRC signaling. In this case, the initial state of the configured SCells is a deactivated state.

At this time, the BS may also inform the UE as whether to perform cross-carrier scheduling. Depending on whether cross-carrier scheduling is performed, signaling and operations performed in the Pcell and Scells are as follows.

If cross-carrier scheduling is not performed (i.e. if cross-carrier scheduling is disabled), a Tx/Rx operation is performed in the PCell (UL/DL). However, since the SCells may be activated through MAC signaling, the Tx/Rx operation is performed even in the SCells when activation signaling for the SCells is received.

If cross-carrier scheduling is performed (i.e. if cross-carrier scheduling is enabled), information about which CIF values have been allocated to the PCell and SCells (mapping of CIF values to CCs) is configured together with a cross-carrier scheduling enabling message. Moreover, linkage information between a PDCCH CC and a PDSCH/PUSCH CC, i.e., between a scheduling CC and a scheduled CC may be transmitted together with or separately from the cross-carrier scheduling enabling message. In the case where cross-carrier scheduling is performed, the Tx/Rx operation is performed in the PCell (DL/UL) and the SCells may be activated through MAC signaling. If the SCells are activated, the Tx/Rx operation is performed according to the signaled cross-carrier scheduling information such as the linkage information and mapping information.

CA shown in FIG. 17 is configured to perform cross-carrier scheduling and it is assumed that the PCell is configured to schedule all of the PCell, the first SCell, and the second SCell. It is also assumed that CIF values allocated to the UE are 0, 1, and 2 with respect to the PCell, the first SCell, and the second SCell, respectively.

The UE monitors PDCCHs for the PCell, the first SCell, and the second SCell using the CIF values 0, 1, 2, respectively and performs the reception and transmission of a shared channel in the PCell or the SCell indicated by the CIF value using PDCCH information received in the PCell.

While the UE performs transmission/reception of control signals and data signals through the PCell and SCells, the SCells may be deactivated by MAC signaling. The present invention provides a method for processing CIF values allocated to the deactivated SCells.

A third embodiment according to this disclosure relates to a method for maintaining a CIF value allocated to a deactivated SCell. A fourth embodiment according to this disclosure relates to a method for releasing a CIF value allocated to a deactivated SCell. The following description of the third and fourth embodiments is based on the premise that the first SCell is deactivated by MAC signaling.

First, according to the method for maintaining a CIF value of a deactivated SCell as the third embodiment disclosed in the description, if an additional SCell is newly configured and a CIF should be assigned, one of CIF values except for the CIF value of the deactivated SCell is selected. In the above example, if a new third SCell is allocated to the UE, the CIF value 1 assigned to the deactivated first SCell is maintained, and one (e.g. 3) of the CIF values except for 1 is selected and assigned to the third SCell.

Thus, the maintained CIF value is assigned to the same SCell when the corresponding SCell is activated by MAC signaling. The BS may perform operations, such as PDCCH search space configuration and scheduled CC indication, using the reassigned CIF value. In other words, if the first SCell is reactivated, the CIF value 1 may be reassigned.

In the above-described third embodiment, when a new SCell is allocated to the UE performing cross-carrier scheduling, the BS may inform the UE of a CIF value assigned to the corresponding SCell together with configuration RRC signaling.

Notably, even when the CIF is maintained, if a cell of the UE is reconfigured, the CIF value may also be reconfigured. Furthermore, even if the SCell is excluded (deconfigured) from a configured set, the maintained CIF value may be reconfigured.

According to such a method for maintaining the CIF value of the deactivated SCell, even when the deactivated SCell is reactivated, ambiguity of the CIF is avoided and signaling overhead for configuring the CIF does not occur.

Next, according to the method for releasing a CIF value of a deactivated SCell as the fourth embodiment disclosed in the description, when an additional SCell is newly configured and a CIF value should be assigned to the newly added SCell, one of CIF values including the CIF value of the deactivated SCell is selected. In the above example, when the new third SCell is allocated to the UE, the CIF value 1 which has been allocated to the deactivated first Scell is released and one of CIF values including 1 is selected and assigned to the third SCell. That is, the CIF value 1 may be assigned to the third SCell.

In this case, the BS may select one of the remaining CIF values as the CIF value newly allocated to the newly configured SCell and may inform the UE of the selected value through signaling.

Accordingly, if the deactivated SCell is activated again, a CIF for the corresponding SCell should be allocated at the same time when or before the SCell is activated. The configuration of the reallocated CIF value may be indicated through RRC signaling or MAC signaling. Such signaling for configuring the CIF value may be received through the always activated PCell, one of the activated SCells, or a scheduling CC. For the reactivated SCell, the BS may perform operations, such as PDCCH search space configuration and scheduled CC indication, using the newly allocated CIF value.

In addition, according to the method for releasing the CIF value of the deactivated SCell, the CIF value of the deactivated SCell does not need to be used again for the same SCell in subsequent processes. Accordingly, in the fourth embodiment, if one of the SCells is deactivated, a CIF value of the PCell or activated SCell may be reallocated.

Meanwhile, in the above-described fourth embodiment, when a new SCell is allocated to the UE performing cross-carrier scheduling, the BS may inform the UE of a CIF value assigned to the SCell together with configuration RRC signaling.

When a cell of the UE is reconfigured, a CIF value may also be reconfigured. In addition, even when an SCell is excluded from a configured set, an allocated CIF value may be released.

Thus, according to the method for releasing the CIF value of the deactivated SCell, the CIF value which has been allocated to the deactivated SCell can be used to configure a new SCell and therefore a use degree of the CIF value is increased.

Meanwhile, since a MAC signaling period is typically shorter than an RRC configuration period, if the CIF value of the deactivated SCell is released, ambiguity of the CIF value can be produced while SCell activation/deactivation through MAC signaling is performed. However, in the communication system according to the embodiments of this disclosure, ambiguity of a CIF can be avoided by signaling the CIF value for the SCell through RRC signaling or MAC signaling before the deactivated SCell is reactivated.

Hereinafter, a PDCCH monitoring method performed as an addition to the above-described third and fourth embodiments when an SCell allocated to the UE is deactivated will be described.

In the communication system according to an additional embodiment of the third and fourth embodiments disclosed in the description, a CIF of a deactivated SCell is added so that a PDCCH can be monitored. That is, according to the additional embodiment, the UE can monitor PDCCHs of a PCell and other SCells by determining that the CIF of the deactivated SCell is added.

In the above additional embodiment, it is assumed that a configuration set including the PCell and SCells is assigned to the UE and cross-carrier scheduling is configured to use the PCell as a scheduling cell as in the aforementioned third and fourth embodiments.

When a PCell and an SCell are assigned to the UE, if the SCell is deactivated, only the PCell performing self-scheduling is in an activation state and thus it is unnecessary to attach a CIF. Notably, a UE according to the additional embodiment of this disclosure monitors a PDCCH only for DCI size always including the CIF irrespective of whether the SCell is deactivated.

The PUCCH monitoring method according to the additional embodiment may be applied regardless of the number of activated PCells and SCells. That is, the additional embodiment may be applied not only when a single PCell and a single SCell are allocated to perform scheduling but also when a PCell and plural SCells are allocated to perform scheduling.

Although the UE according to the additional embodiment has overhead of monitoring the PDCCH while attaching a CIF necessary when all SCells are deactivated, since an activated SCell is generally present to perform a cross-carrier scheduling operation, a unified operation can be performed irrespective of the number of activated/deactivated cells.

The additional embodiment may be modified as follows.

According to the modified additional embodiment, if no activated SCell is left by deactivating SCells allocated to the UE, i.e. if only a cell performing self-scheduling is activated, the UE does not attach a CIF to monitor the PDCCH and monitors the PDCCH for DCI size not including the CIF.

The UE according to the modified embodiment monitors a PDCCH having an optimized bit size according to the number of activated/deactivated SCells and to whether cross-carrier scheduling is configured to be performed.

BS and UE

Figure 18:
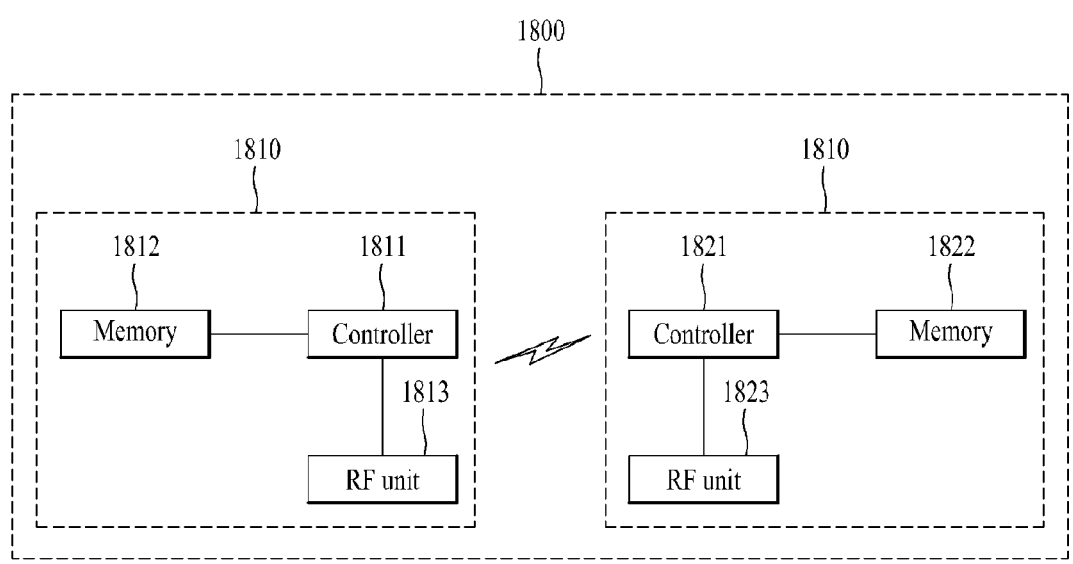
FIG. 18 is a block diagram showing a wireless communication system according to an embodiment of this disclosure.

FIG. 18 is a block diagram showing a wireless communication system according to an embodiment of this disclosure. A wireless communication system 1800 may include a BS 1810 and a UE 1820.

The BS 1810 includes a controller 1811, a memory 1812, and a Radio Frequency (RF) unit 1813.

The controller 1811 implements the proposed functions, processes, and/or methods. Layers of a wireless interface protocol may be achieved by the controller 1811.

The controller 1811 is configured to perform operations according to the embodiments of this disclosure exemplified with reference to the drawings. Specifically, for a detailed operation of the controller 1811, reference can be made to the description of FIG. 1 to FIG. 17. The controller 1811 may manage multiple carriers, indicate CC configuration, and manage cross-carrier scheduling. The controller 1811 may configure a UE-specific CIF in consideration of each CC or CC group or configure a CIF according to deactivation of a CC or SCell.

The memory 1812 is connected to the controller 1811 and stores protocols or parameters for managing multiple carriers. The RF unit 1813 is connected to the controller 1811 and transmits/receives radio signals.

The UE 1820 includes a controller 1821, a memory 1822, and an RF unit 1823.

The controller 1821 implements the proposed functions, processes, and/or methods. Layers of a wireless interface protocol may be achieved by the controller 1821. The controller 1821 may manage multiple carriers, receive DCI including a CIF when cross-carrier scheduling is activated, and monitor a PDCCH according to the CIF.

The memory 1822 is connected to the controller 1821 and stores protocols or parameters for managing multiple carriers. The RF unit 1823 is connected to the controller 1821 and transmits/receives radio signals.

The controllers 1811 and 1821 may include Application-Specific Integrated Circuits (ASICs), other chipsets, logic circuits, and/or data processors. The memory 1812 and 1822 may include Read-Only Memories (ROMs), Random Access Memories (RAMs), flash memories, memory cards, storage media, and/or other storage devices. The RF units 1813 and 1823 may include baseband circuits for processing radio signals. When the embodiments are implemented in software, the above methods may be implemented using modules (processes or functions) for performing the above functions. The modules may be stored in the memories 1812 and 1822 and executed by the processors 1811 and 1821. The memories 1812 and 1822 may be placed inside or outside the controllers 1811 and 1821 and may be coupled to the controllers 1811 and 1821 by a variety of well-known means.

Those skilled in the art will appreciate that the present invention may be embodied in other specific forms than those set forth herein without departing from the spirit and essential characteristics of the present invention. The above description is therefore to be construed in all aspects as illustrative and not restrictive. The scope of the invention should be determined by reasonable interpretation of the appended claims and all changes coming within the equivalency range of the invention are intended to be within the scope of the invention. In addition, claims which are not explicitly dependent on each other can be combined to provide an embodiment or new claims can be added through amendment after this application is filed.

The invention claimed is:

1. A method for allocating a Carrier Indication Field (CIF) in a carrier aggregation system, the method comprising:
    transmitting carrier aggregation configuration information including at least one secondary component carrier to a User Equipment (UE) through a primary component carrier;
    allocating CIF values to the primary component carrier and the at least one secondary component carrier, wherein a first CIF value corresponds to a value of the primary component carrier and a second CIF value corresponds to a value of a first secondary component carrier;
    maintaining the second CIF value regardless of the deactivation of the first secondary component carrier; and
    allocating a third CIF value when a second secondary component carrier is newly set to the UE,
    wherein the second CIF value is different from the third CIF value, and
    wherein the UE performs monitoring Physical Downlink Control Channels (PDCCHs) of the primary component carrier and the second secondary component carrier by estimating that the second CIF value of the deactivated first secondary component carrier is added.

2. The method of claim 1, wherein the primary component carrier is a PDCCH monitoring component carrier.

3. The method of claim 1, wherein the CIF values are expressed as indexes of component carriers or component carrier groups.

4. The method of claim 3, wherein the indexes are configured according to at least one bit size of the CIF values and the number of component carriers or component carrier groups supported by a Base Station (BS) or according to at least one bit size of the CIF values and the number of component carriers or component carrier groups allocated to the UE.

5. The method of claim 3, wherein the indexes are designated first to component carrier groups allocated to the UE, and then designated to component carriers.

6. The method of claim 3, wherein the indexes are used for cross-carrier scheduling.

7. A method for monitoring a control channel in a carrier aggregation system, the method comprising:
    monitoring a plurality of PDCCHs Physical Downlink Control Channels (PDCCHs) through a PDCCH monitoring component carrier;
    receiving Downlink Control Information (DCI) including Carrier Indicator Field (CIF) values through a PDCCH which has succeeded in blind decoding among the plurality of PDCCHs, wherein the CIF values are allocated to the PDCCH monitoring component carrier and the at least one specific component carrier, and wherein a first CIF value corresponds to a value of the PDCCH monitoring component carrier and a second CIF value corresponds to a value of a first specific component carrier;
    maintaining the second CIF value regardless of the deactivation of the first specific component carrier; and
    allocating a third CIF value when a second specific component carrier is newly set to a User Equipment (UE),
    wherein the second CIF value is different from the third CIF value, and
    wherein the UE performs monitoring PDCCHs of the PDCCH component carrier and the second specific component carrier by estimating that the second CIF value of the deactivated first specific component carrier is added.

8. The method of claim 7, wherein the CIF values are expressed as indexes of Component Carriers (CCs) or CC groups for the UE which includes one or more CCs, and
    wherein the indexes are UE-specifically configured.

9. The method of claim 8, wherein the indexes are configured according to at least one bit size of the CIF values and the number of CCs or CC groups for the UE, and
    wherein the indexes are designated first to the CC groups, and then designated to the CCs.

10. The method of claim 7, wherein the indexes are used for cross-carrier scheduling.

* * * * *